US009845931B2

(12) United States Patent
Arita

(10) Patent No.: US 9,845,931 B2
(45) Date of Patent: Dec. 19, 2017

(54) LIGHT SOURCE UNIT AND VEHICLE FRONT LAMP USING THE LIGHT SOURCE UNIT

(71) Applicant: Panasonic Intellectual Property Management Co., Ltd., Osaka (JP)

(72) Inventor: Kosaku Arita, Niigata (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/161,366

(22) Filed: May 23, 2016

(65) Prior Publication Data

US 2016/0320011 A1    Nov. 3, 2016

Related U.S. Application Data

(63) Continuation of application No. 14/285,310, filed on May 22, 2014, now Pat. No. 9,400,090.

(30) Foreign Application Priority Data

| May 31, 2013 | (JP) | 2013-116443 |
|---|---|---|
| May 31, 2013 | (JP) | 2013-116444 |
| May 31, 2013 | (JP) | 2013-116445 |
| May 31, 2013 | (JP) | 2013-116446 |
| May 31, 2013 | (JP) | 2013-116447 |

(51) Int. Cl.
*F21S 8/10* (2006.01)
*B60Q 1/00* (2006.01)

(52) U.S. Cl.
CPC .......... *F21S 48/115* (2013.01); *B60Q 1/0041* (2013.01); *B60Q 1/0088* (2013.01); *F21S 48/1104* (2013.01); *F21S 48/1109* (2013.01); *F21S 48/1159* (2013.01); *F21S 48/1305* (2013.01); *F21S 48/137* (2013.01); *F21S 48/1317* (2013.01); *F21S 48/1323* (2013.01); *F21S 48/1388* (2013.01); *F21S 48/142* (2013.01); *F21S 48/145* (2013.01);
(Continued)

(58) Field of Classification Search
CPC ..... F21S 48/115; F21S 48/328; F21S 48/1159
See application file for complete search history.

(56) References Cited

U.S. PATENT DOCUMENTS

| 7,156,544 B2 | 1/2007 | Ishida |
| 7,186,010 B2 | 3/2007 | Coushaine et al. |
| 7,665,872 B2 | 2/2010 | Nakabayashi |

(Continued)

FOREIGN PATENT DOCUMENTS

| EP | 2 196 727 A1 | 6/2010 |
| JP | 10236221 A | 9/1998 |

(Continued)

OTHER PUBLICATIONS

Co-pending U.S. Appl. No. 14/285,310, filed May 22, 2014.
(Continued)

*Primary Examiner* — Elmito Breval
(74) *Attorney, Agent, or Firm* — Renner, Otto, Boisselle & Sklar, LLP

(57) ABSTRACT

A light source unit including: a first light source module; a second light source module; and a light source arrangement portion between the first light source module and the second light source module. The first light source module and the second light source module are staggered in at least one of a front-and-back direction and a left-and-right direction.

9 Claims, 22 Drawing Sheets

(52) U.S. Cl.
CPC ......... *F21S 48/1747* (2013.01); *F21S 48/328* (2013.01); *F21S 48/33* (2013.01)

(56) References Cited

U.S. PATENT DOCUMENTS

| | | | |
|---|---|---|---|
| 8,235,570 | B2 | 8/2012 | Okubo |
| 2005/0068787 | A1 | 3/2005 | Ishida |
| 2005/0281047 | A1 | 12/2005 | Coushaine et al. |
| 2007/0086202 | A1 | 4/2007 | Tsukamoto et al. |
| 2007/0177401 | A1 | 8/2007 | Nakabayashi |
| 2008/0225544 | A1 | 9/2008 | Fujiwara |
| 2009/0296416 | A1 | 12/2009 | Luo |
| 2010/0194276 | A1 | 8/2010 | Okubo |
| 2010/0244649 | A1 | 9/2010 | Inaba |
| 2011/0051447 | A1 | 3/2011 | Lee |
| 2011/0280030 | A1 | 11/2011 | Iwasaki |
| 2012/0051071 | A1 | 3/2012 | Okubo |
| 2013/0107564 | A1 | 5/2013 | Yatsuda |

FOREIGN PATENT DOCUMENTS

| | | |
|---|---|---|
| JP | 2004-206947 A | 7/2004 |
| JP | 2005-108554 | 4/2005 |
| JP | 2005-340209 A | 12/2005 |
| JP | 2006-004929 | 1/2006 |
| JP | 2006-107875 | 4/2006 |
| JP | 2006-156047 A | 6/2006 |
| JP | 2006-156301 | 6/2006 |
| JP | 2007-109493 A | 4/2007 |
| JP | 2007-207528 | 8/2007 |
| JP | 2007-287610 | 11/2007 |
| JP | 2008-276955 A | 11/2008 |
| JP | 2008-288221 A | 11/2008 |
| JP | 2010-140661 A | 6/2010 |
| JP | 2010-238604 A | 10/2010 |
| JP | 2011-028963 | 2/2011 |
| JP | 2012-004086 A | 1/2012 |
| JP | 2012-204168 | 10/2012 |
| JP | 2012-216557 | 11/2012 |
| JP | 2013-008637 A | 1/2013 |
| JP | 2013-030371 | 2/2013 |
| JP | 2013-030372 | 2/2013 |
| JP | 2006-024509 A | 1/2016 |

OTHER PUBLICATIONS

Korean Office Action dated Oct. 20, 2015 for corresponding Korean Application No. 10-2014-0063750.
Korean Office Action dated Apr. 28, 2016 for corresponding Korean Application No. 10-2014-0063750.
Japanese Office Action dated Sep. 6, 2016 for corresponding Japanese Application No. 2013-116443.
Japanese Office Action dated Sep. 6, 2016 for corresponding Japanese Application No. 2013-116444.
Japanese Office Action dated Sep. 6, 2016 for corresponding Japanese Application No. 2013-116446.
Japanese Office Action dated Sep. 6, 2016 for corresponding Japanese Application No. 2013-116447.
Decision of Rejection in corresponding Japanese Application No. 2013-116443 dated Jun. 6, 2017.

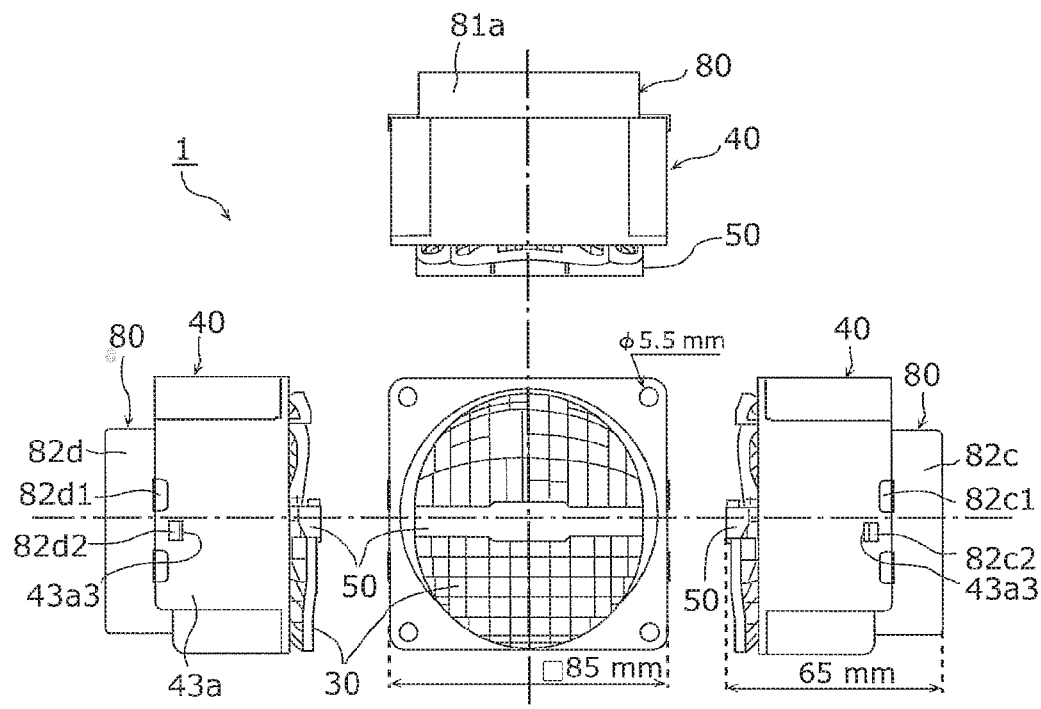
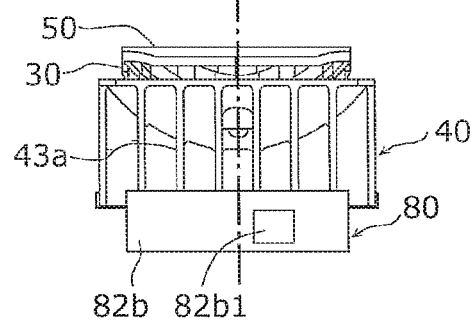

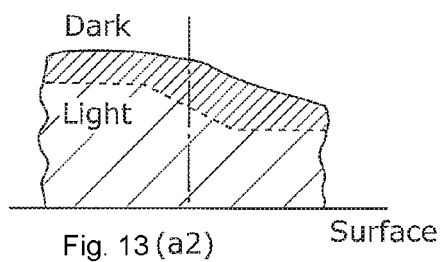
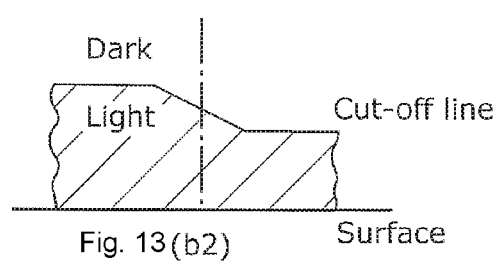
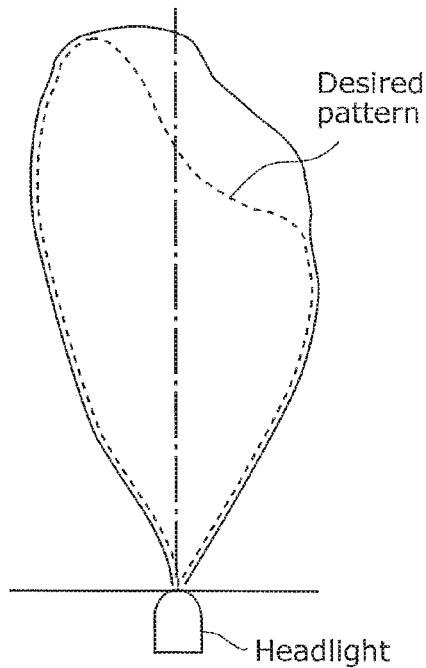
Fig. 13 (a1)
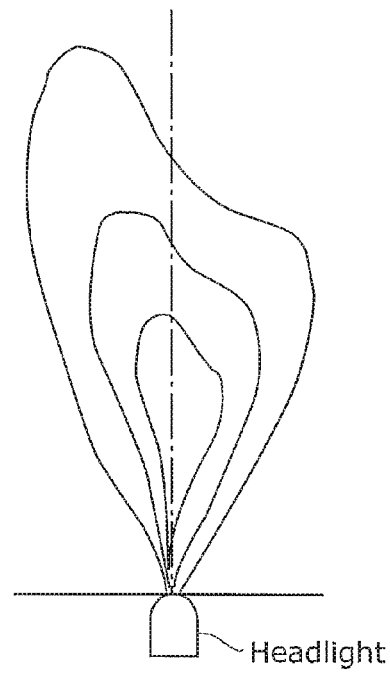
Fig. 13 (b1)

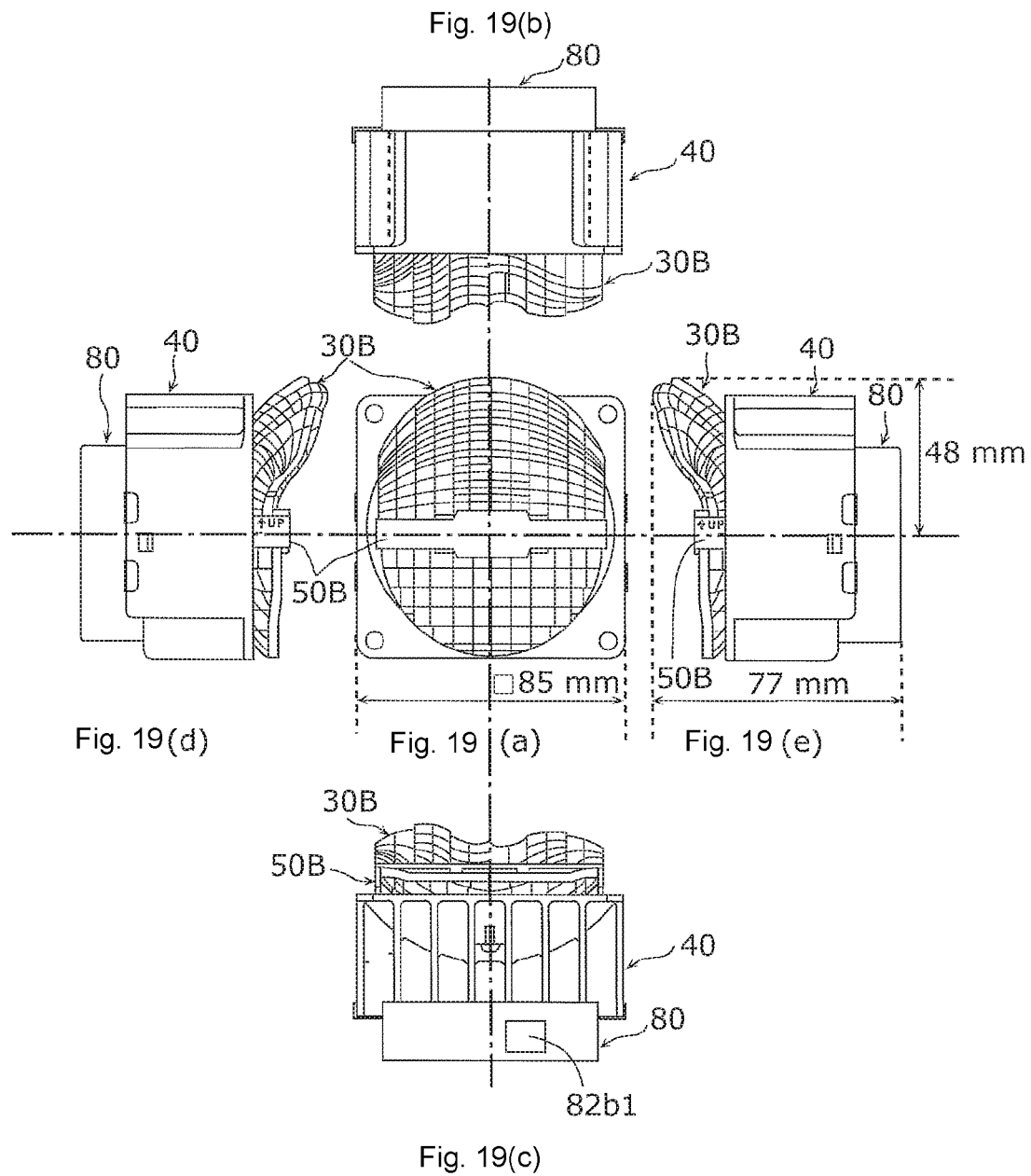

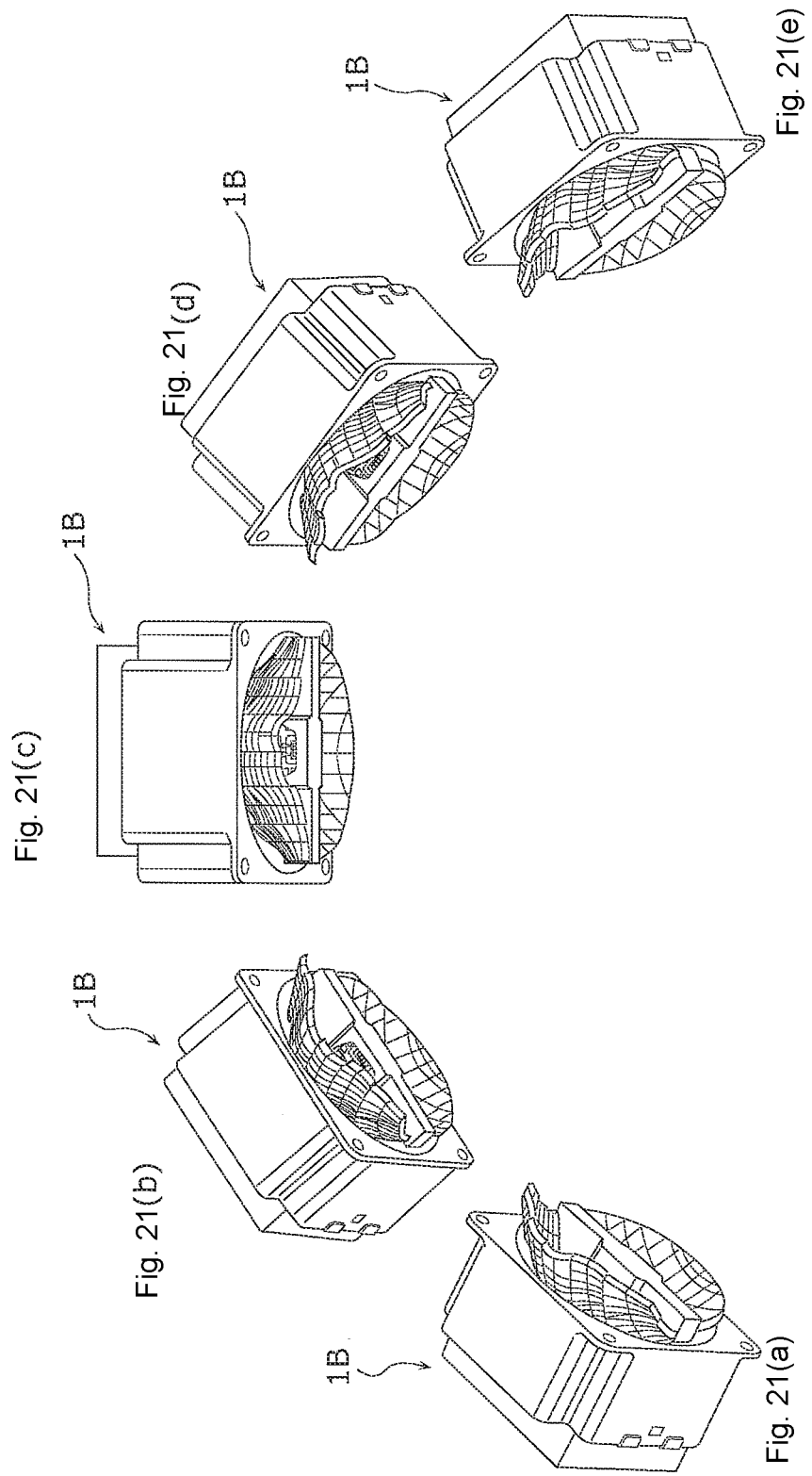

LIGHT SOURCE UNIT AND VEHICLE FRONT LAMP USING THE LIGHT SOURCE UNIT

CROSS-REFERENCE TO RELATED APPLICATIONS

This application is a continuation of U.S. patent application Ser. No. 14/285,310 filed on May 22, 2014, which claims priority of Japanese Patent Application Nos. 2013-116443, 2013-116446, 2013-116447, 2013-116444, and 2013-116445, each filed on May 31, 2013. The entire disclosure of each of the above-identified applications, including the specification, drawings and claims is incorporated herein by reference in its entirety.

TECHNICAL FIELD

The present application relates to a light source unit and a vehicle front lamp using the light source unit.

BACKGROUND ART

Vehicles, such as two-wheeled vehicles (motorbikes) or four-wheeled vehicles, are equipped with a vehicle front lamp, such as a headlamp, for forward illumination of the road and such. Halogen bulb lamps, HID lamps, etc. are conventionally used as the light source in the vehicle front lamp.

Recent years have seen aggressive progress in the development of products in which semiconductor light-emitting elements such as light emitting diodes (LEDs) are used as light sources. LEDs are also being considered as a light source for vehicle front lamps due to their luminous efficiency, which exceeds that of HID lamps, as well as their long lifespan.

For example, a vehicle front lamp using LEDs that includes an LED module, a drive circuit that controls driving of the LED module, and a heat dissipating component that dissipates heat generated by the LED module has been proposed. Additionally, a vehicle front lamp using two LED modules that includes both low beam (passing beam) and high beam (driving beam) functions has also been proposed.

An LED itself generates heat as a result of emitting light, and this heat causes the temperature of the LED to increase and the light output of the LED to decrease. Moreover, an LED malfunctions at a relatively low 150 to 175 degrees Celsius. Additionally, when the intended use is in a vehicle, the temperature of the surrounding area in which the vehicle front lamp is used is a high 125 degrees Celsius, which translates into an allowed increase in temperature of only 25 to 50 degrees Celsius. As such, when LEDs are used as the light source in a vehicle front lamp, it is necessary to effectively dissipate the heat generated by the LEDs. Particularly when two LED modules are used, it is necessary to dissipate heat even more effectively.

Consequently, with conventional vehicle front lamps, provision of a large heat sink (heat dissipating component) is common, leading to an increase in the size and weight of the vehicle front lamp (front lamp ASSY) and thus an increase in cost.

In light of the above, vehicle front lamps that aim to favorably dissipate heat from the LED and the drive circuit have been proposed. For example, Japanese Unexamined Patent Application Publication No. 2013-030371 discloses a vehicle front lamp including a heat dissipating component (heat sink) having an extending portion that extends forward, an LED module for low beam use arranged on the top surface of the extending portion, an LED module for high beam use arranged on the bottom surface of the extending portion, a reflector that reflects light emitted from the two LED modules forward, and a drive circuit that controls driving of the two LED modules.

The vehicle front lamp disclosed in Japanese Unexamined Patent Application Publication No. 2013-030371, further includes a shade for forming the cut-off line for the low beam. The shade is attached to a leading end portion of the extending portion.

In another example, Japanese Unexamined Patent Application Publication No. 2007-207528 discloses a vehicle front lamp including first and second LED units, first and second reflectors, and a light source stand that supports the first and second LED units. In this vehicle front lamp, the first LED unit is fixed to the light source stand with a first clip, and the second LED unit is fixed to the light source stand with a second clip.

SUMMARY

Technical Problem

A problem with the vehicle front lamp disclosed in Japanese Unexamined Patent Application Publication No. 2013-030371 is that the vehicle front lamp is long in the depthwise direction, resulting in a heavy heat sink.

One aspect of the present invention was conceived to solve the above-described problem and has a first goal to provide a light source unit and a vehicle front lamp that is shorter in the depthwise direction.

Another problem with the vehicle front lamp disclosed in Japanese Unexamined Patent Application Publication No. 2013-030371 is that the cut-off line is blurry, whereby a desired beam pattern cannot be obtained.

One aspect of the present invention has a second goal to provide a light source unit and a vehicle front lamp that achieves a desired beam pattern.

Yet another problem with the vehicle front lamp disclosed in Japanese Unexamined Patent Application Publication No. 2013-030371 is that the heat generated by each the two LED modules affects the other. In particular, when the two LED modules emit light simultaneously, the heat generated by each of the two LED modules affects the light-emitting state of the other, leading to the problem of a decreased output of light.

One aspect of the present invention has a third goal to provide a light source unit and a vehicle front lamp that reduces the effect heat generated by each of the two light source modules has on the other.

Moreover, with the vehicle front lamp disclosed in Japanese Unexamined Patent Application Publication No. 2013-030371, since the drive circuit is provided in front of the heat sink (on the LED module side), there is a problem that the drive circuit is easily affected by the heat generated by the LED module. In particular, since the vehicle front lamp is hermetically sealed and thereby substantially absent of air flow, when the drive circuit is arranged in front of the heat sink (in other words, when the drive circuit is internally enclosed), there is a problem that heat generated by the drive circuit cannot easily escape.

Furthermore, when the drive circuit is provided on the front side of the heat sink, there is a problem that the heat sink is long in the depthwise direction and the heat sink is heavy.

One aspect of the present invention has a fourth goal to provide a light source unit and a vehicle front lamp having a heat sink that is short in the depthwise direction and minimizes the effect heat from the light source module has on the drive circuit.

Moreover, with the vehicle front lamp disclosed in Japanese Unexamined Patent Application Publication No. 2007-207528, since the two LED units (light source modules) are fixed in place individually, there is a problem that two fixing components and steps for fixing the LED units in place are required.

One aspect of the present invention has a fifth goal to provide a light source unit and a vehicle front lamp with which two light source module can be easily fixed in place.

Solution to Problem

In order to achieve the above-described first goal, a first light source unit according to one aspect of the present invention includes: a light source module; a heat sink including a light source arrangement portion on which the light source module is arranged and a concave portion opened to surround the light source arrangement portion; and a reflector which includes a through-hole through which the light source arrangement portion is inserted and reflects light emitted from the light source module. The reflector is arranged having at least a portion thereof located in the concave portion.

Moreover, in the first light source unit according to one aspect of the present invention, the reflector and the concave portion may have a void therebetween.

Moreover, in the first light source unit according to one aspect of the present invention, the void may permit air to flow therethrough.

Moreover, in the first light source unit according to one aspect of the present invention, one of the reflector and the concave portion may include a protruding portion abutting an other of the reflector and the concave portion.

Moreover, in the first light source unit according to one aspect of the present invention, the other of the reflector and the concave portion may include a sunken portion at an abutment location of the protruding portion.

In order to achieve the above-described second goal, a second light source unit according to one aspect of the present invention includes: a heat sink including a light source arrangement portion; a first light source module and a second light source module arranged sandwiching the light source arrangement portion; a reflector which reflects light emitted from the first light source module and the second light source module; and a light-blocking component that blocks a portion of the light emitted from at least one of the first light source module and the second light source module and reflected off the reflector, the light-blocking component blocking the portion of the light to form two predetermined types of beam patterns. The light-blocking component has a surface that reduces light reflection.

Moreover, in the second light source unit according to one aspect of the present invention, the light source arrangement portion may be formed as a portion of the heat sink extending therefrom, and the light-blocking component may be attached to the light source arrangement portion and positioned in front of the first light source module and the second light source module.

Moreover, in the second light source unit according to one aspect of the present invention, the surface of the light-blocking component may be a dark color.

Moreover, in the second light source unit according to one aspect of the present invention, the surface of the light-blocking component may be black.

Moreover, in the second light source unit according to one aspect of the present invention, the surface of the light-blocking component may be deglossed.

Moreover, in the second light source unit according to one aspect of the present invention, the light-blocking component may be made of a nonmetallic material.

In this case, the nonmetallic material may be resin.

Moreover, in the second light source unit according to one aspect of the present invention, the first light source module and the second light source module may be arranged sandwiching the light source arrangement portion from above and below. The light-blocking component may include (i) a central portion connected to a front end portion of the light source arrangement portion and (ii) a pair of side portions located on respective sides of the central portion and extending in a left-and-right direction toward the reflector. The central portion may have a front surface having a vertical width greater than a vertical width of a front surface of each of the pair of side portions.

In this case, the central portion may include an extension portion extending rearward from an upper end portion and a lower end portion of the central portion.

Furthermore, in the second light source unit according to one aspect of the present invention, the light-blocking component may include a light-blocking wall covering a side of the first light source module and a side of the second light source module.

Moreover, in the second light source unit according to one aspect of the present invention, the reflector may have an upper end portion that extends forward beyond the light-blocking component.

Moreover, in the second light source unit according to one aspect of the present invention, the light-blocking component may include a protruding rail at a portion connecting with the light source arrangement portion, the light source arrangement portion may include a groove that receives the protruding rail, and by fitting the protruding rail and the groove together, the light-blocking component may be slidably insertable into the light source arrangement portion.

Moreover, in the second light source unit according to one aspect of the present invention, the first light source module and the second light source module may be staggered in at least one of a front-and-back direction and a left-and-right direction.

Moreover, in the second light source unit according to one aspect of the present invention, the two predetermined types of beam patterns may be a high-beam beam pattern and a low-beam beam pattern.

In order to achieve the above-described third goal, a third light source unit according to one aspect of the present invention includes: a heat sink including a light source arrangement portion; a first light source module and a second light source module arranged sandwiching the light source arrangement portion; and a reflector which reflects light emitted from the first light source module and the second light source module. The light source arrangement portion includes a gap in a portion sandwiched by the first light source module and the second light source module.

Moreover, in the third light source unit according to one aspect of the present invention, the first light source module and the second light source module may be arranged sandwiching the light source arrangement portion from above and below, and the gap may be formed by dividing a portion of the light source arrangement portion into upper and lower portions.

Moreover, in the third light source unit according to one aspect of the present invention, the light source arrangement portion may include a first light source arrangement portion on which the first light source module is arranged, a second light source arrangement portion on which the second light source module is arranged, and a joining portion joining the first light source arrangement portion and the second light source arrangement portion.

Moreover, in the third light source unit according to one aspect of the present invention, the joining portion may join the first light source arrangement portion and the second light source arrangement portion in rearward portions thereof.

Moreover, in the third light source unit according to one aspect of the present invention, the light source arrangement portion may be formed as a portion of the heat sink extending therefrom.

Moreover, in the third light source unit according to one aspect of the present invention, the first light source module and the second light source module may be staggered in either one of a front-and-back direction and a left-and-right direction.

Moreover, the third light source unit according to one aspect of the present invention may further include a light-blocking component that blocks a portion of the light emitted from at least one of the first light source module and the second light source module and reflected off the reflector. A portion of the light-blocking component is inserted in the gap.

Moreover, in the third light source unit according to one aspect of the present invention, at least one of the first light source module and the second light source module may be inclined toward the reflector.

In order to achieve the above-described fourth goal, a fourth light source unit according to one aspect of the present invention includes: a light source module; a light source arrangement portion on which the light source module is arranged; a heat sink including a plurality of heat dissipation fins that are plate-shaped and arranged in a first direction such that main surfaces thereof face each other; a drive circuit for controlling driving of the light source module; and a circuit cover having the drive circuit arranged therein. The light source arrangement portion is provided on a front side of the heat sink, the plurality of heat dissipation fins are provided on a back side of the heat sink, and the circuit cover is attached to the plurality of heat dissipation fins such that at least two ventilation holes are present in a spatial region framed by adjacent ones of the plurality of heat dissipation fins and the circuit cover.

Moreover, in the fourth light source unit according to one aspect of the present invention, the at least two ventilation holes may be present in a direction intersecting the first direction.

Moreover, in the fourth light source unit according to one aspect of the present invention, the first direction may be a horizontal direction, one of the at least two ventilation holes may be present in an upper portion of the spatial region, and an other of the at least two ventilation holes may be present in a lower portion of the spatial region.

Moreover, in the fourth light source unit according to one aspect of the present invention, the circuit cover may include an open portion, and the open portion may face the plurality of heat dissipation fins.

Moreover, in the fourth light source unit according to one aspect of the present invention, the drive circuit may include a circuit substrate having a circuit element mounted thereon, the circuit cover may include a base portion and a side wall portion surrounding the base portion, and the circuit substrate may be arranged on the base portion.

Moreover, in the fourth light source unit according to one aspect of the present invention, the plurality of heat dissipation fins may include a groove in a rearward end portion, and the side wall portion may be fitted in the groove.

Moreover, in the fourth light source unit according to one aspect of the present invention, the side wall portion may be made up of a plurality of side panels surrounding the base portion, and a gap may be present in a meeting point between adjacent ones of the plurality of side panels.

Moreover, the fourth light source unit according to one aspect of the present invention may further include a ventilation hole located between the side wall portion and an outermost one of the plurality of heat dissipation fins and communicating with the spatial region.

In order to achieve the above-described fifth goal, a fifth light source unit according to one aspect of the present invention includes: a heat sink including a light source arrangement portion; a first light source module and a second light source module arranged sandwiching the light source arrangement portion; and a clamping component that clamps the first light source module and the second light source module to the light source arrangement portion.

Moreover, in the fifth light source unit according to one aspect of the present invention, the clamping component may include a first holding portion that holds the first light source module down on the light source arrangement portion, a second holding portion that holds the second light source module down on the light source arrangement portion, and a joining portion joining the first holding portion and the second holding portion.

Moreover, in the fifth light source unit according to one aspect of the present invention, the light source arrangement portion may be formed as a portion of the heat sink extending therefrom, the heat sink may include an insertion hole for insertion of the clamping component, the first holding portion and the second holding portion may be inserted through the insertion hole, and the joining portion may face a rearward end portion of the light source arrangement portion.

Moreover, in the fifth light source unit according to one aspect of the present invention, the first light source module and the second light source module may be simultaneously fixed to the light source arrangement portion by pushing the clamping component forward via the insertion hole.

Moreover, the fifth light source unit according to one aspect of the present invention may further include a fixing component for fixing together the joining portion and the rearward end portion of the light source arrangement portion.

Moreover, in the fifth light source unit according to one aspect of the present invention, the first holding portion may be folded back onto itself at a leading end portion thereof and the second holding portion may be folded back onto itself at a leading end portion thereof.

Moreover, in the fifth light source unit according to one aspect of the present invention, the clamping component may be a flat spring.

Moreover, in the fifth light source unit according to one aspect of the present invention, the first light source module and the second light source module may each include a light-emitting unit and a substrate on which the light-emitting unit is mounted, and the clamping component may clamp the substrate of the first light source module and the substrate of the second light source module.

Moreover, the fifth light source unit according to one aspect of the present invention may further include a reflector that reflects the light emitted from the light source module. The light source arrangement portion may be formed as a portion of the heat sink extending therefrom, and the reflector may include a through-hole through which the light source arrangement portion is inserted.

Moreover, a fifth vehicle front lamp according to one aspect of the present invention includes the third light source unit according to any one of the above aspects, a housing for attaching the fifth light source unit, and an optical component arranged in front of the third light source unit.

A sixth light source unit according to an aspect of the present invention includes: a first light source module; a second light source module; and a light source arrangement portion between the first light source module and the second light source module. The first light source module and the second light source module are staggered in at least one of a front-and-back direction and a left-and-right direction.

Moreover, in the sixth light source according to one aspect of the present invention, the first light source module is positioned further forward than the second light source module.

Moreover, in the sixth light source according to one aspect of the present invention, the first light source module is a low-beam light-emitting diode (LED) module, and the second light source module is a high-beam LED module.

Moreover, in the sixth light source according to one aspect of the present invention, a reflector that reflects light from the first light source module and the second light source module; and a light-blocking component that blocks a portion of the light emitted from at least one of the first light source module and the second light source module and reflected off the reflector, the light-blocking component blocking the portion of the light to form two predetermined types of beam patterns. The light-blocking component has a surface that reduces light reflection.

Moreover, in the sixth light source according to one aspect of the present invention, the surface of the light-blocking component is deglossed.

Moreover, in the sixth light source according to one aspect of the present invention, a reflection rate of visible light on the surface of the light-blocking component is at least less than a reflection rate of visible light on the reflector.

Moreover, in the sixth light source according to one aspect of the present invention, a surface roughness Ra of the light-blocking component is at least 0.5 μm.

Moreover, in the sixth light source according to one aspect of the present invention, a heat sink is further included, wherein the light source arrangement portion is formed as a portion of the heat sink extending therefrom, and the light-blocking component is attached to the light source arrangement portion and positioned in front of the first light source module and the second light source module.

Moreover, a vehicle front lamp according to one aspect of the present invention includes the light source unit according to any of the above first through sixth aspects, a housing for attaching the light source unit, and an optical component arranged in front of the light source unit.

Advantageous Effects

With the first light source unit according to an aspect of the present invention, it is possible to achieve a light source unit having a short length in the depthwise direction.

With the second light source unit according to an aspect of the present invention, it is possible to achieve a desired beam pattern with a light source unit including two light source modules.

With the third light source unit according to an aspect of the present invention, it is possible to reduce the effect heat generated by each of the two light source modules has on the other.

With the fourth light source unit according to an aspect of the present invention, it is possible to shorten the length of the heat sink in the depthwise direction while reducing the effect heat from the light source module has on the drive circuit.

With the fifth light source unit according to an aspect of the present invention, the two light source module can easily be fixed to the heat sink.

BRIEF DESCRIPTION OF DRAWINGS

The figures depict one or more implementations in accordance with the present teaching, by way of example only, no by way of limitations. In the figures, like reference numerals refer to the same or similar elements.

FIG. 2(a) is a front view of the light source unit according to an embodiment of the present invention, FIG. 2(b) is a top view of the same light source unit, FIG. 2(c) is a bottom view of the same light source unit, FIG. 2(d) is a left side view of the same light source unit, and FIG. 2(e) is a right side view of the same light source unit.

FIG. 4A is viewed from the side.

FIG. 13 illustrates the beam pattern of the low beam in the light source unit according to a comparative example and an embodiment of the present invention, and specifically FIG. 13(a1) illustrates the distribution of light on the road with the light source unit according to the comparative example, FIG. 13(a2) illustrates the vertical illuminance of the light source unit according to the comparative example, FIG. 13(b1) illustrates the distribution of light on the road with the light source unit 1 according to the embodiment, and FIG. 13(b2) illustrates the vertical illuminance of the light source unit according to the embodiment.

FIG. 19(a) is a front view of the light source unit according to the second modified embodiment of the present invention, FIG. 19(b) is a top view of the same light source unit, FIG. 19(c) is a bottom view of the same light source unit, FIG. 19(d) is a left side view of the same light source unit, and FIG. 19(e) is a right side view of the same light source unit.

FIGS. 21(a)-21(e) illustrate the light source unit according to the second modified embodiment of the present invention at various angles.

DETAILED DESCRIPTION

Figure 1A:
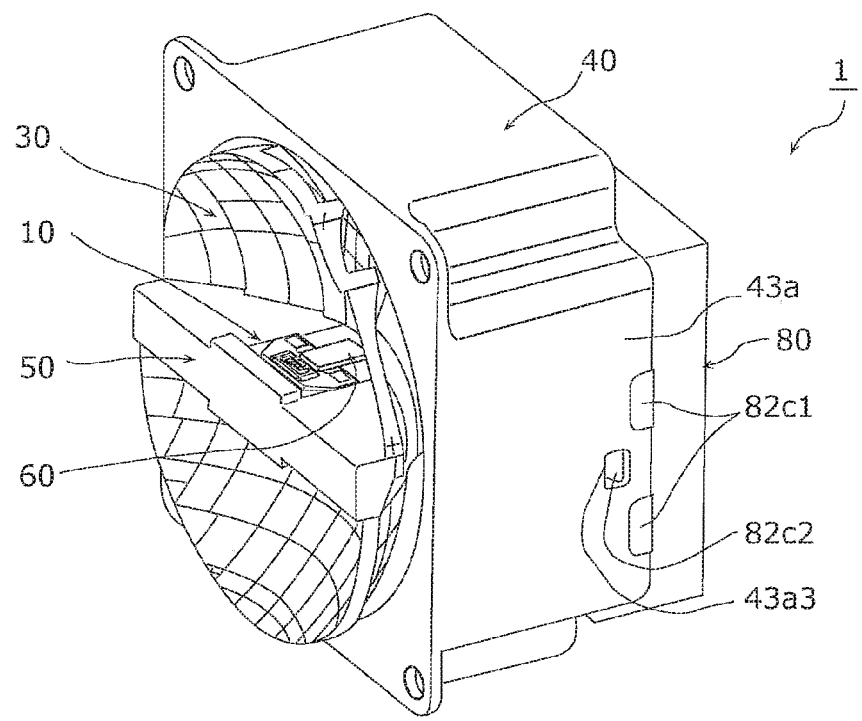
FIG. 1A is a perspective view of the front of the light source unit according to an embodiment of the present invention from above.

Hereinafter, an illumination light source and a lighting apparatus according to exemplary embodiments of the present invention are described with reference to the Drawings. It should be noted that each of the subsequently-described embodiments show one specific preferred example of the present invention. The numerical values, shapes, materials, structural components, the arrangement and connection of the structural components, steps, order of the steps etc. shown in the following exemplary embodiments are mere examples, and are not intended to limit the scope of the present invention. As such, among the structural components in the following exemplary embodiments, components not recited in any one of the independent claims which indicate the broadest concepts of the present invention are described as arbitrary structural components.

Moreover, in the present specification, "forward" is the direction in which light is emitted from the light source unit (light emission direction), and "rearward" is the direction opposite "forward". It should be noted that, unless otherwise noted, "left", "right", "up", and "down" refer to directions when the light source unit is viewed from the front. Moreover, the up-and-down direction is the vertical direction, and the front-and-back direction is, among horizontal directions, the axis direction of the light source unit, and the left-and-right direction is, among horizontal directions, a direction perpendicular to both the vertical direction and the front-and-back direction.

It should be noted that the respective figures are schematic diagrams and are not necessarily precise illustrations. Additionally, components that are essentially the same share the same reference numerals in the respective figures, and overlapping explanations thereof are omitted or simplified.

(Overall Structure of the Light Source Unit)

Figure 1B:
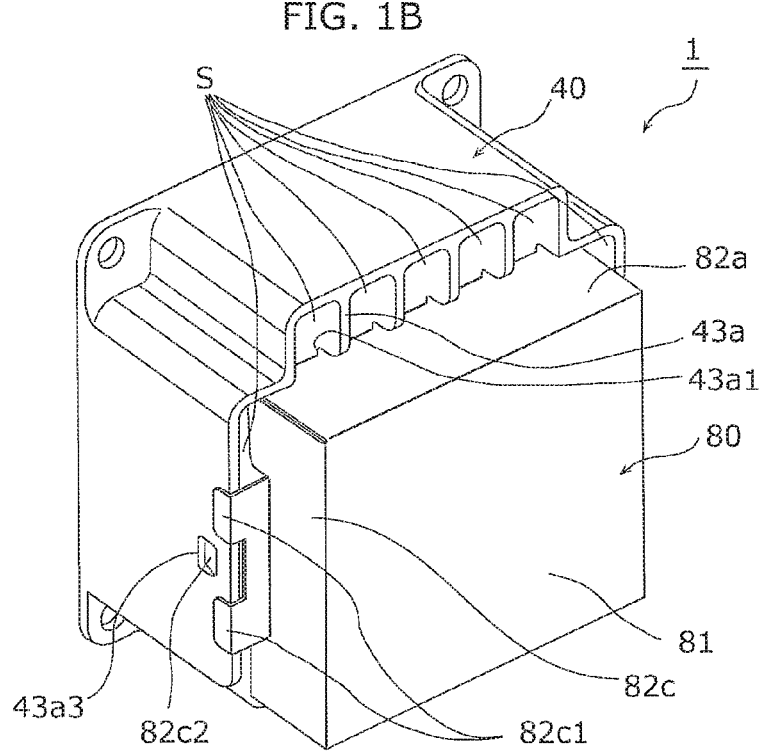
FIG. 1B is a perspective view of the back of the light source unit according to an embodiment of the present invention from above.
Figure 3:
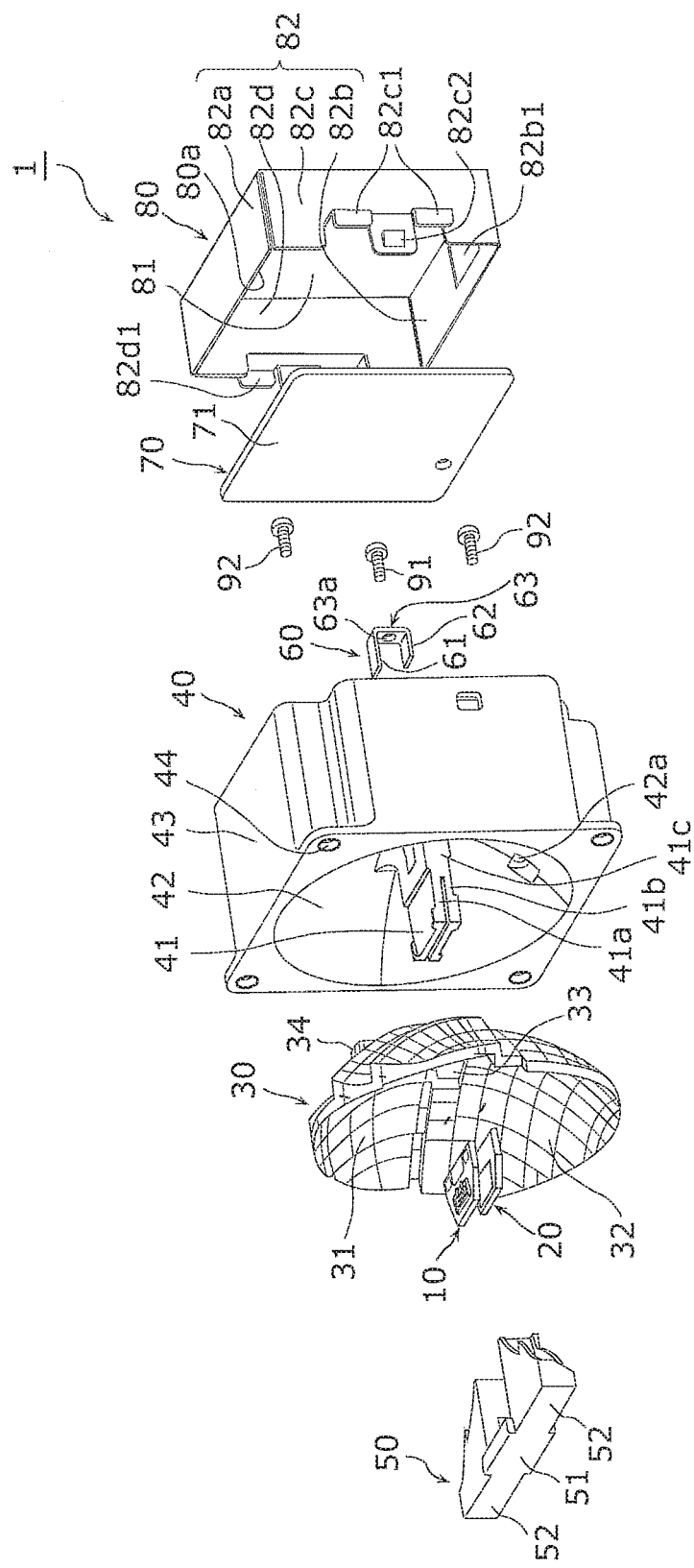
FIG. 3 is an exploded perspective view of the light source unit according to an embodiment of the present invention.

First, the general structure of the light source unit 1 according to an embodiment of the present invention will be described with reference to FIG. 1A, FIG. 1B, FIG. 2, and FIG. 3. FIG. 1A is a perspective view of the front of the light source unit according to an embodiment of the present invention from above, and FIG. 1B is a perspective view of the back of the same light source unit from above. FIG. 2 illustrates the structure of the light source unit according to an embodiment of the present invention, where (a) is a front view, (b) is a top view, (c) is a bottom view, (d) is a left side view, and (e) is a right side view. FIG. 3 is an exploded perspective view of the light source unit according to an embodiment of the present invention.

The light source unit 1 according to the embodiment of the present invention is, for example, a light source unit used in a vehicle front lamp, such as a headlamp. As is illustrated in FIG. 1A, FIG. 1B, and FIG. 2, the light source unit 1 includes a first light source module 10, a second light source module 20, a reflector 30, a heat sink 40, and a light-blocking component 50. The light source unit 1 further includes a holddown spring 60, a drive circuit 70, and a circuit cover 80.

The light source unit 1 according to the embodiment is angular, and as is illustrated in (a) in FIG. 2, has mounting angle dimension of, for example, 85 mm. Moreover, as is illustrated in (e) in FIG. 2, the depthwise dimension (length in the depthwise direction) of the light source unit 1 is, for example, 65 mm.

Figure 4A:
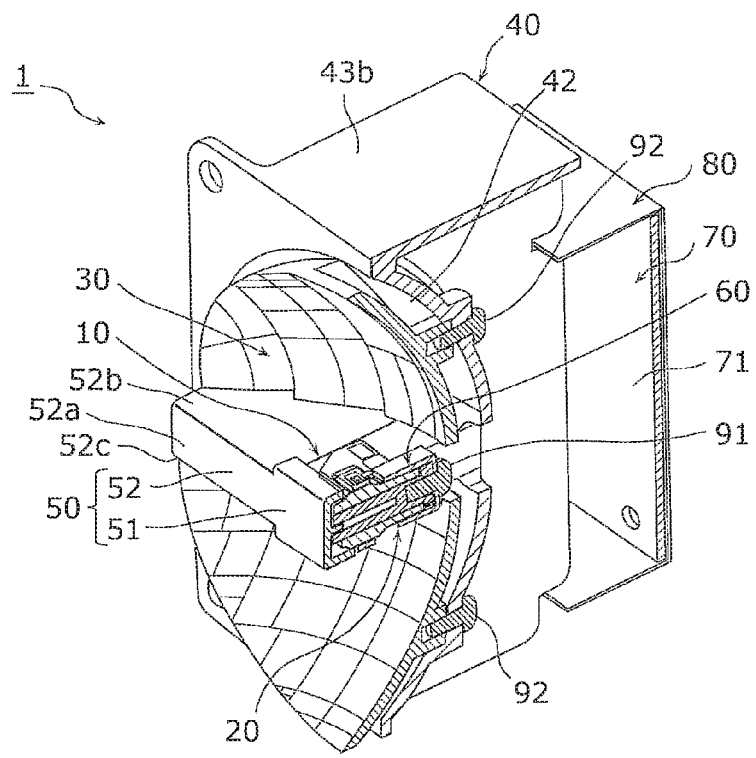
FIG. 4A is a cross-sectional perspective view of the front of the light source unit according to an embodiment of the present invention from above.
Figure 4B:
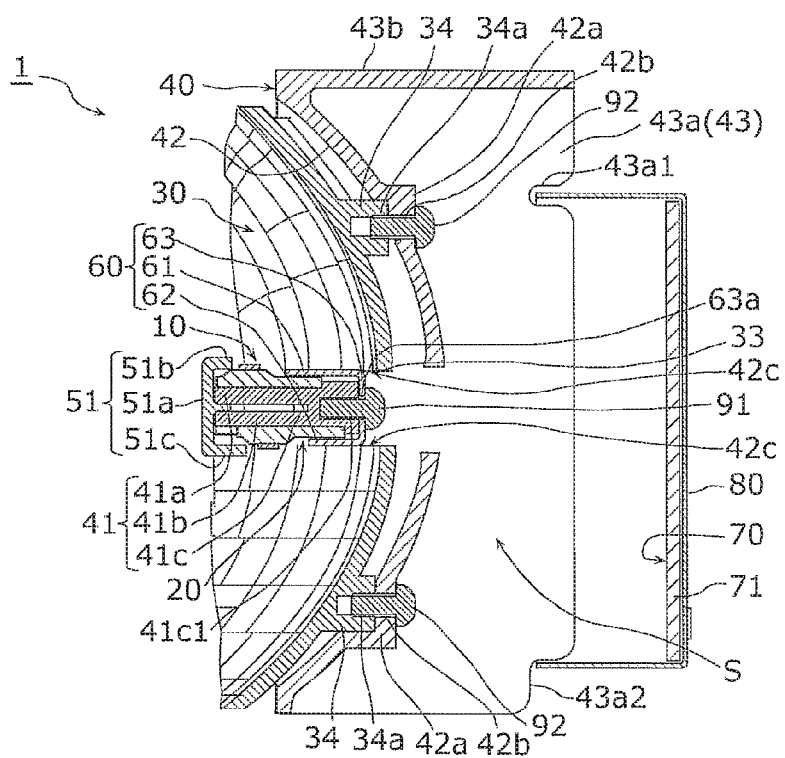
FIG. 4B is a cross-sectional view of the light source unit according to an embodiment of the present invention when
Figure 5:
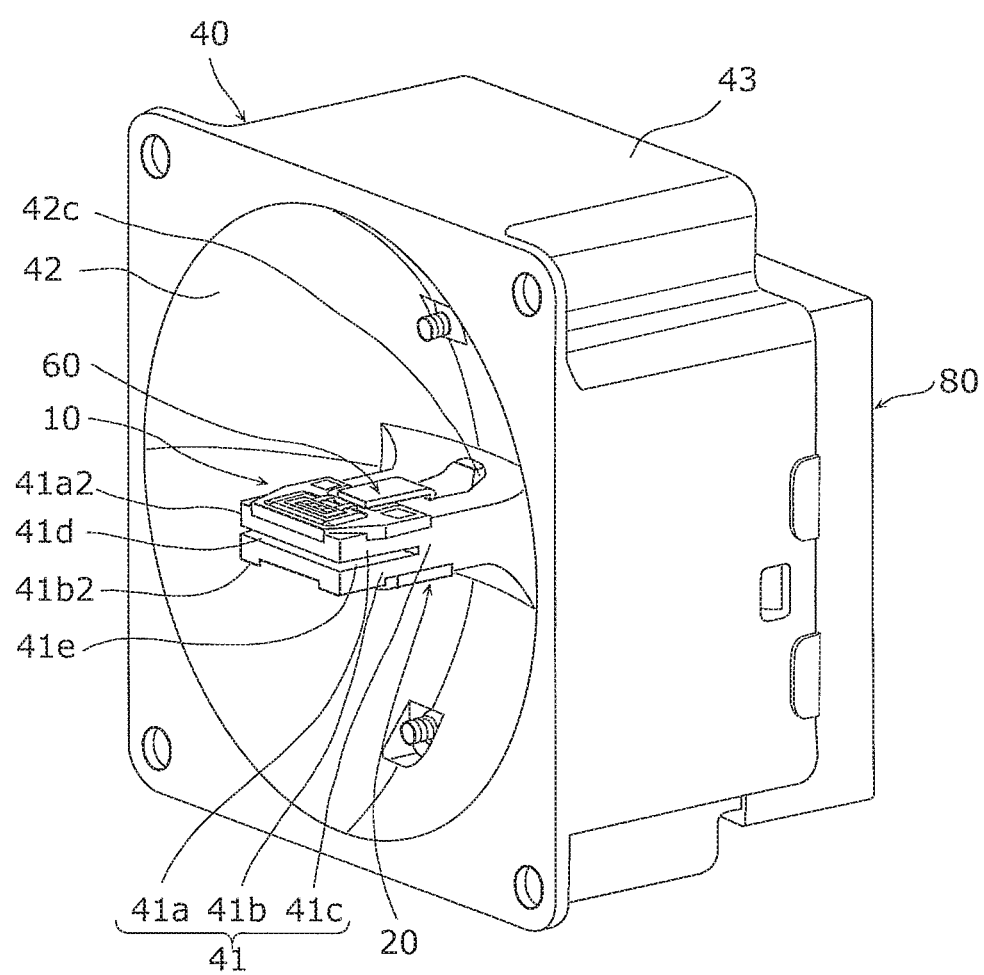
FIG. 5 is a perspective view of the light source unit according to an embodiment of the present invention with the reflector and the light-blocking component removed.

Next, the structural components and connection of the structural components in the light source unit 1 according to the embodiment will be described in detail using FIG. 4A, FIG. 4B, and FIG. 5, with reference to FIG. 1A through FIG. 3. FIG. 4A is a cross-sectional perspective view of the front of the light source unit according to an embodiment of the present invention from above, and FIG. 4B is a cross-sectional view of the same light source unit when FIG. 4A is viewed from the side. FIG. 5 is a perspective view of the light source unit according to an embodiment of the present invention with the reflector and the light-blocking component removed.

(Light Source Module)

The first light source module 10 and the second light source module 20 constitute the light source component of the light source unit 1. The first light source module 10 is an LED module for low beam use, which is a passing beam, and emits light to illuminate a near portion of the road ahead. On the other hand, the second light source module 20 is an LED module for high beam use, which is a driving beam, and emits light to illuminate a far portion of the road ahead.

In the embodiment, the light-emitting state of the first light source module 10 and the second light source module 20 can be selectively switched according to a selection made by the user (driver of the vehicle), and either one of the first light source module 10 or the second light source module 20 emits light based on a signal (power) from the drive circuit 70 according to the selection made by the user. It should be noted that a configuration in which both the first light source module 10 and the second light source module 20 emit light at the same time instead of one or the other of the first light source module 10 and the second light source module 20 is also acceptable.

As is illustrated in FIG. 4A, FIG. 4B, and FIG. 5, the first light source module 10 and the second light source module 20 are arranged on a light source arrangement portion 41 of the heat sink 40 so as to sandwich the light source arrangement portion 41 from above and below. More specifically, the first light source module 10 is fixed to the top surface of the light source arrangement portion 41 of the heat sink 40 with the light-emitting surface facing upward. The second light source module 20 is fixed to the bottom surface of the light source arrangement portion 41 with the light-emitting surface facing downward. Although not shown in the Drawings, it should be noted that the first light source module 10 and the second light source module 20 are arranged on the light source arrangement portion 41 with heat transfer material therebetween. This allows the heat generated by the first light source module 10 and the second light source module 20 to be effectively transferred to the heat sink 40 (light source arrangement portion 41).

Moreover, in the embodiment, the first light source module 10 and the second light source module 20 are arranged staggered in the front-and-back direction. More specifically, the first light source module 10 is positioned further forward than the second light source module 20. This makes it possible to reduce the length in the depthwise direction (front-and-back length) of the light source unit 1.

In other words, since the desired light distribution pattern of the low beam and the high beam is different, the positional relationship of the first light source module 10 and the second light source module 20 relative to the reflective surface of the reflector 30 is different. As such, if the positions of the first light source module 10 and the second light source module 20 in the front-and-back direction were to be made the same, the front-and-back length of the light source unit 1 would increase. For this reason, in the embodiment, the first light source module 10 and the second light source module 20 are arranged staggered in the front-and-back direction. This allows for the front-and-back length of the light source unit 1 to be shortened. Consequently, a compact, light-weight light source unit 1 can be achieved. The first light source module 10 and the second light source module 20 are staggered (the distance from the end of one substrate to the end of the other substrate in the front-and-back direction) by, for example, 5.0 mm to 20.0 mm.

It should be noted that the first light source module 10 and the second light source module 20 may be staggered in the left-and-right direction instead of the front-and-back direction. Even in this case, the front-and-back length of the light source unit 1 can be shortened. Moreover, the first light source module 10 and the second light source module 20 may be staggered in any of the left-and-right and front-and-back directions.

Figure 6:
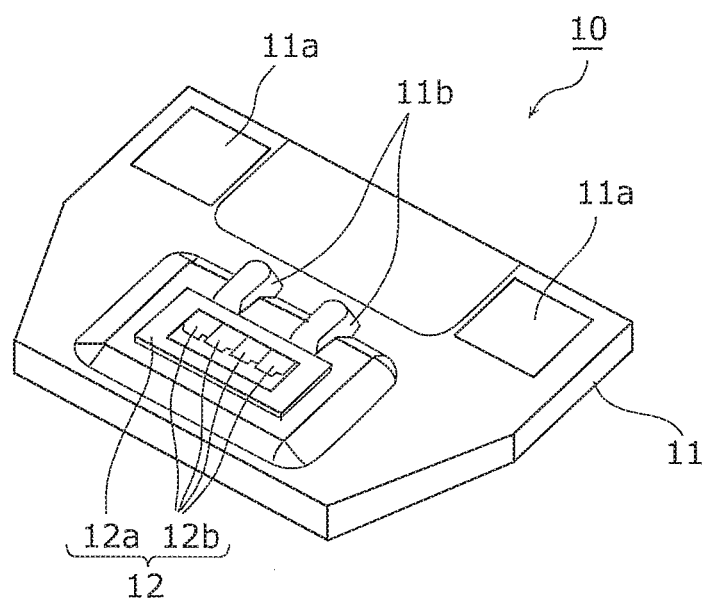
FIG. 6 is a perspective view of the first light source module in the light source unit according to an embodiment of the present invention.

Next, the structure of the first light source module 10 and the second light source module 20 will be described in detail using FIG. 6. FIG. 6 is a perspective view of the first light source module in the light source unit according to an embodiment of the present invention. It should be noted that the first light source module 10 and the second light source module 20 have the same structure, and as such, hereinafter only the structure of the first light source module 10 will be described.

As is illustrated in FIG. 6, the first light source module 10 is an LED unit (an LED package) which uses an LED, and includes a substrate 11 and a light-emitting apparatus (light-emitting unit) 12 arranged on the substrate 11.

The substrate 11 includes: a metal heat transfer plate (heat spreader) for transferring heat from the light-emitting apparatus 12 to the heat sink 40; and a wiring substrate arranged on the heat transfer plate. The wiring substrate includes an insulating substrate material made of resin and metal wiring and electrode pads formed in a predetermined pattern on the insulating substrate material etc. Moreover, an insulating layer is formed on the surface of the insulating substrate material so as to expose the electrode pads. A highly reflective white resist, for example, can be used as the insulating film.

As is illustrated in FIG. 6, it should be noted that two of the electrode pads 11a are provided, and each electrode pads 11a is electrically connected to an LED chip on the light-emitting apparatus 12 via metal wiring (not shown in the Drawings) and a bonding wire 11b. The electrode pad 11a is a connection terminal that receives direct current power for causing the light-emitting apparatus 12 to emit light, and is connected to a lead wire drawn from the drive circuit 70. For example, a high voltage side (plus side) lead wire is connected to one of the two electrode pads 11a, and a low voltage side (minus side) lead wire is connected to the other of the two electrode pads 11a.

The light-emitting apparatus 12 is a light-emitting unit having an LED as the light source, and is mounted on the substrate 11. The light-emitting apparatus 12 is, for example, an LED module having a chip on board (COB) structure in which LED chips (bare chips) are directly mounted on a mounting substrate. The light-emitting apparatus 12 includes a mounting substrate 12a, an LED 12b mounted on the mounting substrate 12a, and a sealing material (not shown in the Drawings) which seals the LED 12b.

The mounting substrate 12a is a sub-mount arranged on the substrate 11, and is a substrate for mounting the LED 12b. For example, a ceramic substrate made from aluminum oxide (alumina) or aluminum nitride, for example, a metal-based substrate made from metal with a resin coated layer, or a resin substrate made from resin can be used as the mounting substrate 12a.

A plurality of LEDs 12b are mounted on the mounting substrate 12a. Each LED 12b is a bare chip which emits a monochromatic visible light and is die-bonded on the mounting substrate 12a with a die touch material (die bond material). A blue LED chip which emits a blue light when power passes through it can be used as the LED 12b (bare chip). The blue LED chip is a gallium nitride semiconductor light-emitting element having a central wavelength of 400 nm to 480 nm, formed of an n-type gallium nitride compound semiconductor layer, a light-emitting layer formed from a gallium nitride compound semiconductor containing indium, and a p-type gallium nitride compound semiconductor layer stacked in this order on a sapphire substrate. The chip size of the LED chip is, for example, about 1 mm squared with a thickness of roughly 100 μm, but the chip size is not limited to this example.

The sealing material is formed on the mounting substrate 12a so as to seal the plurality of LEDs 12b (for example, all of the LEDs 12b) on the mounting substrate 12a collectively. It should be noted that the sealing material may be formed to seal each of the LEDs 12b individually.

The sealing material is mainly made from a translucent material, but when it is necessary to convert the wavelength of the light emitted from the LEDs 12b into a predetermined wavelength, a wavelength converting material is mixed into the translucent material. The sealing material according to the embodiment includes a phosphor as the wavelength converting material, and is a wavelength converting component which converts the wavelength (color) of the light emitted from the LEDs 12b.

Silicon resin, for example, can be used as the translucent resin material in the sealing material. It should be noted that the translucent resin material is not limited to silicon resin; a fluorocarbon polymer, hybrid resin of silicon resin and epoxy resin, or a urea resin, for example, can be used.

When, for example, blue LEDs which emit a blue light are used as the LEDs 12b, yttrium aluminum garnet (YAG) yellow phosphor particles, for example, can be used as the phosphor particles contained in the sealing material in order to yield a white light. With this, a portion of the blue light emitted from the LEDs 12b is wavelength-transformed into a yellow light by the yellow phosphor particles included in the sealing material. Then, the blue light not absorbed by the yellow phosphor particles mixes with the yellow light resulting from the wavelength-transformation by the yellow phosphor particles so that the light emitted from the sealing material is white. Alternatively, the sealing material can be dispersed with a light diffusing material such as silica particles. The yellow phosphor particles are not limited to YAG phosphor particles; for example, silicate phosphor particles, nitride phosphor particles, oxynitride phosphor particles, sialon phosphor particles, or sulfide phosphor particles can be used.

It should be noted that the wavelength converting material can be provided as a separate material from the sealing material, and provided directly or indirectly on the outside of the sealing material.

(Reflector)

The reflector 30 is a reflecting component that reflects light emitted from the first light source module 10 and the second light source module 20. The front surface (reflective surface) of the reflector 30 is shaped so as to reflect, in a predetermined direction, the light emitted from the first light source module 10 and the second light source module 20.

In this case, the shape of the reflective surface may be altered to include a first reflecting portion (upper portion) 31 that reflects the light emitted from the first light source module 10 and a second reflecting portion (lower portion) 32 that reflects the light emitted from the second light source module 20. This makes it possible to form a desired beam pattern for each of the low beam and the high beam. Moreover, the shape of the reflective surface may be altered such that the first reflecting portion 31 and the second reflecting portion 32 are provided on left and right portions, respectively. This makes it possible to make the left-and-right symmetry of the beam pattern about the optical axis unsymmetrical.

Moreover, the first reflecting portion 31 and the second reflecting portion 32 may be configured as separate components and arranged such that the reflective surfaces are non-contiguous. However, in the embodiment, the first reflecting portion 31 and the second reflecting portion 32 are integrally formed, whereby the reflective surface of the first reflecting portion 31 and the reflective surface of the second reflecting portion 32 are contiguous. In other words, the reflector 30 is a single component. Forming the first reflecting portion 31 and the second reflecting portion 32 as a single component eliminates the need to form them individually, thereby reducing the man-hours required to assemble the reflector.

The reflector 30 configured in this manner can be manufactured by, for example, forming a mirror surface by metal vapor deposition (for example, aluminum vapor deposition) on the surface of a heat-resistant resin.

As is illustrated in FIG. 3, FIG. 4A, and FIG. 4B, the reflector 30 according to the embodiment is a substantially bowl-shaped (substantially dome-shaped) reflective plate (reflective mirror) having a front surface functioning as a reflective surface that is sunken in. In other words, the reflector 30 has a curved surface protruding rearward. The reflector 30 is arranged having at least a portion thereof located in a concave portion 42 of the heat sink 40. In other words, at least a portion of the reflector 30 is present in the space framed by the concave portion 42.

Figure 7:
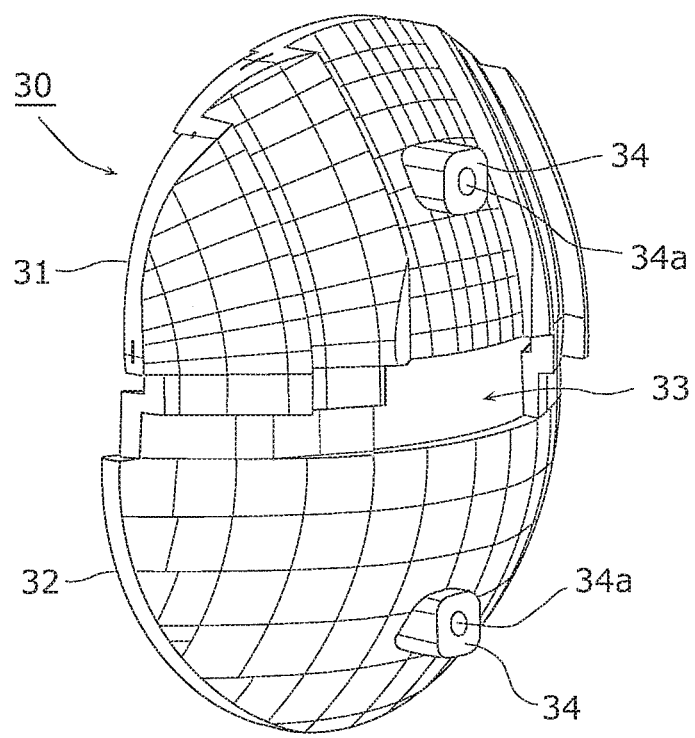
FIG. 7 is a perspective view from behind of the reflector in the light source unit according to an embodiment of the present invention.

Moreover, as is illustrated in FIG. 7, the substantially central portion of the reflector 30 is provided with a through-hole 33 through which the light source arrangement portion 41 of the heat sink 40 is inserted. FIG. 7 is a perspective view from behind of the reflector in the light source unit according to an embodiment of the present invention.

When fixing the reflector 30 and the heat sink 40 together, the reflector 30 and the heat sink 40 are arranged in place by inserting the light source arrangement portion 41 through the through-hole 33 and bringing the back surface of the reflector 30 and the inner surface of the concave portion 42 of the heat sink 40 near each other, as is illustrated in FIG. 4B.

At this time, the reflector 30 is arranged such that the back surface of the reflector 30 and the front surface of the heat sink 40 (the inner surface of the concave portion 42) are separated such that a gap (void) is present between the back surface of the reflector 30 and the front surface of the heat sink 40.

Moreover, as is illustrated in FIG. 7, two protruding portions 34 which contact the heat sink 40 are provided on the back surface of the reflector 30.

More specifically, the protruding portion 34 contacts the bottom surface of a sunken portion 42a formed in the inner surface of the concave portion 42 of the heat sink 40, as is illustrated in FIG. 4B. The protruding portion 34 coming into contact with the bottom surface of the sunken portion 42a determines the relative positioning of the reflector 30 and the heat sink 40. As such, the distance of the gap between the reflector 30 and the heat sink 40 can be set according to the height of the protruding portion 34. In other words, provision of the protruding portion 34 makes it easy to determine the relative positioning of the reflector 30 and the heat sink 40 with a high degree of accuracy.

Moreover, in the embodiment, the first light source module 10 and the second light source module 20 are fixed to the heat sink 40 (the light source arrangement portion 41). With this, the protruding portion 34 makes it easy to determine not only the relative positioning of the reflector 30 and the heat sink 40 with a high degree of accuracy, but the relative positioning of, with respect to the heat sink 40, (i) the first light source module 10 and the second light source module 20 and (ii) the reflector 30 easily and with a high degree of accuracy as well.

As is illustrated in FIG. 7, a screw hole 34a is provided in the protruding portion 34. As is illustrated in FIG. 4B, while the protruding portion 34 is abutting the sunken portion 42, a reflector screw 92 is inserted through the through-hole 42b in the sunken portion 42a from behind the heat sink 40 and screwed into the screw hole 34a in the protruding portion 34. This makes it possible to fix the reflector 30 and the heat sink 40 together.

(Heat Sink)

The heat sink 40 is a heat dissipating component for dissipating heat generated by the first light source module 10 and the second light source module 20 to the outside (to the atmosphere). As such, the heat sink 40 is preferably formed using a material having a high rate of heat transfer, such as metal. The heat sink 40 is, for example, an aluminum die cast of an aluminum composite metal, such as Al—Si—Fe (HT-1) or Al—Si—CU (ADC12), for example. It should be noted that in the embodiment, the front surface of the heat sink 40 is treated with alumite.

Figure 8A:
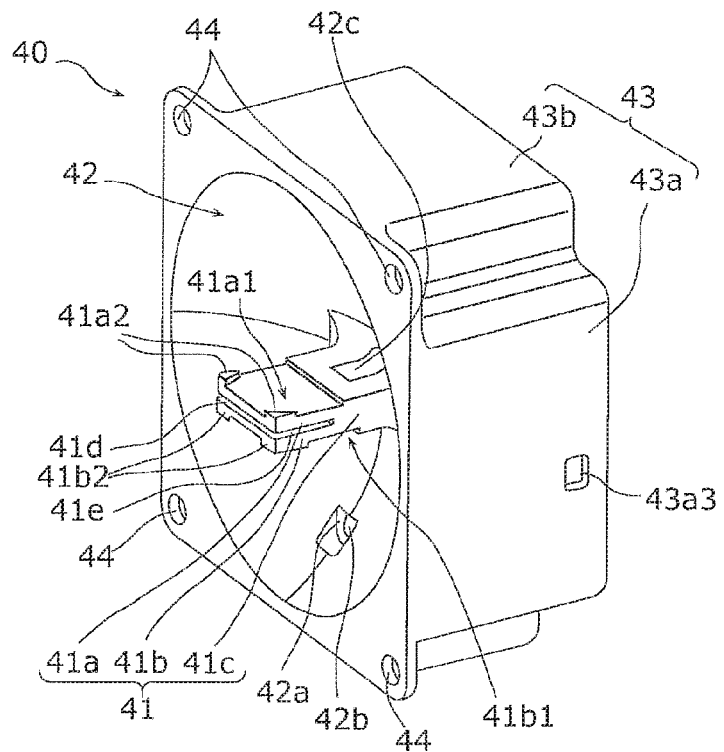
FIG. 8A is a perspective view of the front of the heat sink in the light source unit according to an embodiment of the present invention.

Next, a detailed description of the structure of the heat sink 40 will be given using FIG. 8A and FIG. 8B. FIG. 8A is a perspective view of the front of the heat sink in the light source unit according to an embodiment of the present invention, and FIG. 8B is a perspective view of the back of the same heat sink.

Figure 8B:
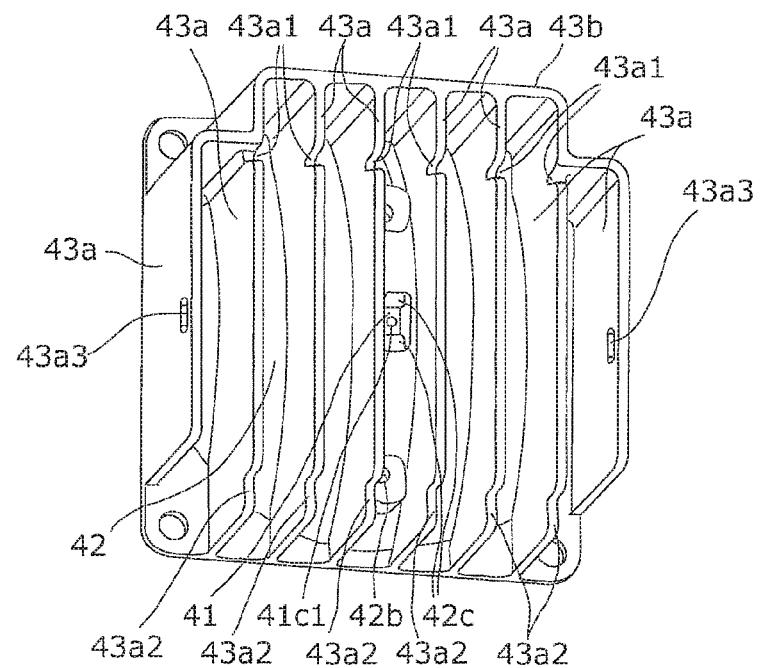
FIG. 8B is a perspective view of the back of the heat sink in the light source unit according to an embodiment of the present invention.

As is illustrated in FIG. 8A and FIG. 8B, the heat sink 40 includes a light source arrangement portion 41, a concave portion 42 opened to surround the light source arrangement portion 41, and a heat dissipating portion 43 provided on the back surface side of (behind) the concave portion 42.

The light source arrangement portion 41 is a portion for arranging the first light source module 10 and the second light source module 20, and is formed extending out from a portion of the heat sink 40. The light source arrangement portion 41 according to the embodiment is provided on the front surface side (in front) of the concave portion 42 and extends forward from the substantially central portion (the portion sunken the deepest) of the concave portion 42. It should be noted that the light source arrangement portion 41 according to the embodiment is provided extending beyond the inner portion of the concave portion 42. In other words, when the heat sink 40 is viewed from the side, the front end portion of the light source arrangement portion 41 can be seen.

Moreover, a portion of the light source arrangement portion 41 is divided into upper and lower portions. In the embodiment, the light source arrangement portion 41 is split into two portions—upper and lower—that project from the base portion on the concave portion 42 side toward the front. The light source arrangement portion 41 includes: a first light source arrangement portion 41a and a second light source arrangement portion 41b divided with a gap (void) therebetween; and a joining portion 41c joining the first light source arrangement portion 41a and a second light source arrangement portion 41b.

More specifically, the substantially flat-plate-shaped first light source arrangement portion 41a and the substantially flat-plate-shaped second light source arrangement portion 41b are provided with a predetermined gap (void) therebetween in the vertical direction, and the first light source arrangement portion 41a and the second light source arrangement portion 41b are connected together in a rearward portion by the joining portion 41c. With this, grooves 41d and 41e formed by the gap between the first light source arrangement portion 41a and the second light source arrangement portion 41b are formed in the frontward, left side, and right side surfaces of the light source arrangement portion 41.

The groove 41d is formed in the frontward surface of the light source arrangement portion 41, and when the light source arrangement portion 41 is viewed from the front, extends from one of the left-and-right edges of the light source arrangement portion 41 to the other. The groove 41e is formed in the right and left side surfaces of the light source arrangement portion 41, and when the light source arrangement portion 41 is viewed from the side, extends from the frontward edge of the light source arrangement portion 41 to the joining portion 41c.

Moreover, as is illustrated in FIG. 4A, FIG. 4B, and FIG. 5, the gap between the first light source arrangement portion 41a and the second light source arrangement portion 41b is directly below the first light source module 10 and directly above the second light source module 20. In other words, the gap is provided in the light source arrangement portion 41 between the first light source module 10 and the second light source module 20.

More specifically, the gap defined by the first light source arrangement portion 41a and the second light source arrangement portion 41b extends in the horizontal direction, and the region in which the gap is present is greater than the region sandwiched by the first light source module 10 (substrate) and the second light source module 20 (substrate).

With this configuration, since the gap between the first light source arrangement portion 41a and the second light source arrangement portion 41b functions as a heat-insulating barrier of air, it is possible to reduce the effect heat generated by each of the first light source module 10 and the second light source module 20 has on the other. For example, it is possible to reduce the transfer of heat generated by one of the first light source module 10 and the second light source module 20 to the other. This makes it possible to achieve a compact, light-weight light source unit 1 since it is possible to arrange the first light source module 10 and the second light source module 20 to be closer together. Moreover, since the effect heat has on each other can be reduced, the lifespan of the first light source module 10 and the second light source module 20 can be increased. In particular, this advantageous effect is great when the first light source module 10 and the second light source module 20 emit light at the same time, since the temperature increases evenly due to the respectively generated heat.

In the embodiment, the distance of the gap defined by the first light source arrangement portion 41a and the second light source arrangement portion 41b (the distance of the gap in the portion of the light source arrangement portion 41 sandwiched by the first light source module 10 and the second light source module 20) is preferably within the range 0.5 mm to 2.0 mm. When the gap is less than 0.5 mm, there is a possibility that the gap will close in the case of, for example, physical impact. On the other hand, when the gap is greater than 2.0 mm, it is difficult to make the size of the light source unit 1 compact. Moreover, it is further preferable that the gap be within a range of 1.0 mm to 1.5 mm. This makes it easier to insert, for example, a portion of the light-blocking component 50 in the gap.

Furthermore, as is illustrated in FIG. 8A, an indention 41a1 for placement of the first light source module 10 is provided in the first light source arrangement portion 41a. Moreover, in accordance with the provision of the indention 41a1, two protrusions 41a2 are provided on the first light source arrangement portion 41a. The protrusion 41a2 functions as a stopper for the substrate 11 of the first light source module 10, and the end portion of the substrate 11 contacts the protrusion 41a2. In this way, positioning of the first light source module 10 is restricted by the first light source module 10 being placed in the indention 41a1.

Similarly, an indention 41b1 for placement of the second light source module 20 is provided in the second light source arrangement portion 41b, and in accordance with the provision of the indention 41b1, two protrusions 41b2 are provided on the second light source arrangement portion 41b. The protrusion 41b2 is also a stopper and is in contact with the substrate of the second light source module 20. In this way, positioning of the second light source module 20 is restricted by the second light source module 20 being placed in the indention 41b1.

Moreover, as is illustrated in FIG. 8B, a screw hole 41c1 is provided in the rearward surface of the joining portion 41c. As is illustrated in FIG. 4B, a holddown spring screw 91 inserted from behind through a through-hole 63a in the holddown spring 60 held down in the rearward portion of the light source arrangement portion 41 is screwed in the screw hole 41c1.

As is illustrated in FIG. 4A and FIG. 4B, the concave portion 42 is formed so as to correspond to the shape of the reflector 30. The concave portion 42 in the embodiment curves in a rearward direction, and the shape of the inner surface is formed to have the outer surface shape of, substantially, a hemisphere. In this way, the inner surface of the concave portion 42 is a concave surface.

As is illustrated in FIG. 4B and FIG. 8A, two sunken portions 42a that correspond to the two protruding portions 34 of the reflector 30 are provided in the concave portion 42. A bottom surface that abuts the protruding portion 34 is formed in the sunken portion 42a. Moreover, the through-hole 42b passing through the heat sink 40 in the front-and-back direction is provided in the sunken portion 42a. Upon fixing the reflector 30 and the heat sink 40 together, the reflector screw 92 is inserted through the through-hole 42b from the back of the concave portion 42.

Moreover, an insertion hole 42c is provided in the concave portion 42. The insertion hole 42c is formed for the holddown spring 60 to be inserted into. More specifically, as is illustrated in FIG. 8B, a single opening is formed in the back surface side of the concave portion 42, and two openings are formed on the front surface side of the concave portion 42 on the top surface and bottom surface sides of the light source arrangement portion 41 for insertion of a first holding portion 61 and a second holding portion 62. It should be noted that a lead wire electrically connecting the first light source module 10 and the second light source module 20 to the drive circuit 70 is also inserted in the insertion hole 42c.

The heat sink 40 is configured such that at least a portion of the reflector 30 is positioned inside the concave portion 42 when the reflector 30 and the heat sink 40 are fixed together. With this configuration, the length of the light source unit in the depthwise direction can be made to be shorter than conventional vehicle front lamps.

The heat dissipating portion 43 is the main heat dissipating portion of the heat sink 40, and dissipates heat transferred from the heat sink 40 to the outside. It should be noted that in the heat sink 40, heat is dissipated in regions other than the heat dissipating portion 43 as well.

As is illustrated in FIG. 4A, FIG. 4B, and FIG. 8B, the heat dissipating portion 43 includes heat dissipation fins 43a. Provision of the heat dissipation fins 43a in this manner allows for the contact area with air to be increased while at the same time saving surface area of the heat dissipating portion 43, and as such, heat can be efficiently dissipated by the heat sink 40.

The heat dissipation fins 43a extend in the vertical direction (up-and-down direction) and are made up of a plurality of plate-shaped components. In other words, the plurality of plate-shaped heat dissipation fins 43a each stand vertically from the back surface of the concave portion 42 and are lined up in the left-and-right direction.

The heat dissipation fins 43a other than the outermost heat dissipation fins 43a in the left-and-right direction are formed on the back surface of the concave portion 42 bulging rearward, but the rearward ends of these heat dissipation fins 43a are formed to be flush with each other. In other words, the width (height) of the heat dissipation fins 43a from the top down changes from wide, to narrow, to wide again. Moreover, the outermost heat dissipation fins 43a in the left-and-right direction form the outline of the heat dissipating portion 43 and are exposed such that the outer surfaces thereof can be seen from the outside, even after attachment of the circuit cover 80 to the heat sink 40.

A groove 43a1 is provided in a rearward end portion of each of the plurality of heat dissipation fins 43a other than the outermost heat dissipation fins 43a in the left-and-right direction. An end portion of a top wall 82a of the circuit cover 80 is fitted in the groove 43a1. With this, the positioning of the circuit cover 80 in the up-and-down direction relative to the heat sink 40 is restricted.

It should be noted that a notch 43a2 is provided in a bottom end portion of the heat dissipation fin 43a. A bottom wall 82b of the circuit cover 80 latches onto the notch 43a2.

Moreover, as is illustrated in FIG. 1A, FIG. 1B, and FIG. 2, inner surfaces of clasps 82c1 and 82d1 provided on a right wall 82c and a left wall 82d, respectively, of the circuit cover 80 abut the outer surfaces of the outermost heat dissipation fins 43a in the left-and-right direction. With this, the positioning of the circuit cover 80 in the left-and-right direction relative to the heat sink 40 is restricted. It should be noted that a through-hole 43a3 is provided on each of the outermost heat dissipation fins 43a in the left-and-right direction. Protrusions 82c2 and 82d2 provided on the right wall 82c and the left wall 82d, respectively, of the circuit cover 80 catch on the through-holes 43a3 so as to clasp thereto. This makes it possible to fix the heat sink 40 and the circuit cover 80 together.

As is illustrated in FIG. 8A, an attachment hole 44 is provided in each of the four corner portions of the heat sink 40. The attachment holes 44 are used when the light source unit 1 is attached to the housing of the vehicle front lamp. For example, it is possible to insert screws through the attachment holes 44 from either the front or back surface, and attach the light source unit 1 to the housing of the vehicle front lamp.

This configuration makes it possible to easily replace only the light source unit 1, thereby reducing the cost of parts in the case of replacement. In other words, with existing vehicle front lamps that use LEDs, since the LED light source (light source unit) is larger in size than the opening portion of the vehicle front lamp and intricately attached, if an abnormality occurs in the LED light source (loss of light, flickering, reduction of light), the whole vehicle front lamp needs to be replaced. In contrast, with the embodiment, by providing holes or openings in appropriate locations on the vehicle front lamp corresponding to the attachment holes 44, if an abnormality occurs in the light source unit 1, only the light source unit 1 can easily be replaced.

Moreover, by attaching the light source unit 1 to the housing of the vehicle front lamp using the attachment holes 44, designing the mechanism for aiming or leveling the vehicle front lamp is simple.

It should be noted that, in the embodiment, the diameter of the attachment hole 44 is 5.5 mm, but the diameter is not limited to this example. Moreover, the attachment holes 44 are provided in the four corner portions of the heat sink 40, but this example is not limiting. It is preferable that the attachment holes 44 be provided on two of the corner portions.

(Light-Blocking Component)

The light-blocking component 50 is a separator separating the concave space framed by the reflector 30 and, in order to form two predetermined beam patterns (light distribution patterns), blocks the light emitted from at least one of the first light source module 10 and the second light source module 20 and reflected off the reflector 30. The two predetermined beam patterns are beam patterns for two beams that travel at different angles, and in the embodiment, are the beam pattern for the high beam and the beam pattern for the low beam.

Moreover, the light-blocking component 50 according to the embodiment blocks a portion of light emitted from both the first light source module 10 and the second light source module 20.

For example, a portion of the light emitted from the first light source module 10 and traveling downward at an angle after being reflected by the first reflecting portion (upper portion) 31 of the reflector 30 is blocked by the upper portion of the light-blocking component 50. This forms the predetermined pattern for the low beam and the cut-off line for the low beam.

On the other hand, a portion of the light emitted from the second light source module 20 and traveling upward at an angle after being reflected by the second reflecting portion (lower portion) 32 of the reflector 30 is blocked by the lower portion of the light-blocking component 50.

It should be noted that the light-blocking component 50 also blocks a portion of light emitted from both the first light source module 10 and the second light source module 20 that directly hits the light-blocking component 50.

The light-blocking component 50 is a light-absorbing component that actively absorbs light, and the surface of the light-blocking component 50 is configured to reduce the reflection of light. The reflection rate of visible light on the surface of the light-blocking component 50 is at least less than the reflection rate of the reflector 30, and the reflection rate of the surface of the light-blocking component 50 can be, for example, 0.1% to 10.0%.

Moreover, the surface roughness Ra of the light-blocking component 50 may be 0.5 μm or more. This makes it easy to make the reflection rate of the light-blocking component 50 10% or less. The surface roughness Ra of the light-blocking component 50 is preferably 1.0 μm≤Ra≤10.0 μm. This makes it possible to more favorably decrease the reflection rate. Even more preferably, the reflection rate Ra is 2.0 μm≤Ra≤5.0 μm.

In the embodiment, since the first light source module 10 and the second light source module 20 emit white light (visible light), the surface of the light-blocking component 50 is black. This makes it possible to reduce the reflection of light by the light-blocking component 50 since the surface of the light-blocking component 50 can absorb the white light in a satisfactory manner.

For example, when the first light source module 10 is turned on and caused to emit the low beam, the light arriving at the light-blocking component 50 is absorbed by the light-blocking component 50. This makes it possible to reduce the reflection of light at the light-blocking component 50. As a result, it is possible to reduce glare and achieve a desired beam pattern. Moreover, it is possible to achieve a clear cut-off line.

It should be noted that the color of the surface of the light-blocking component 50 may be a color other than black so long as it absorbs the light emitted from the first light source module 10 and the second light source module 20 in a satisfactory manner and reduces the reflection of light. For example, the surface of the light-blocking component 50 may be a dark color such as a shade of brown or grey, and if the color of light emitted from the first light source module 10 and the second light source module 20 is a color other than white, a different color may be used.

Furthermore, the surface of the light-blocking component 50 is treated with a low-reflection treatment for minimizing the reflection of light; a treatment in which the surface is deglossed, for example, can be used. In the embodiment, all surfaces of the light-blocking component 50 are matte black. In this way, by deglossing the surface of the light-blocking component 50, reflection of the light emitted from the first light source module 10 and the second light source module 20 off the light-blocking component 50 can further be reduced. This makes it possible to more accurately achieve a desired beam pattern.

It should be noted that the surface treatment to reduce the reflection of light is not limited to a treatment in which the surface is deglossed; a different low-reflection treatment may be performed. For example, the light-blocking component 50 can be coated with an anti-reflection coating, an anti-reflection film can be applied to the light-blocking component 50, and a chemical conversion treatment, such as an alumite (anodic oxide film), can be performed on the light-blocking component 50.

The light-blocking component 50, for example, can be made of a nonmetallic material, such as resin. When resin is used as the material for the light-blocking component 50, it is preferable that the resin be a high-temperature resin, such as polyphenylene sulfide (PPS), since the light-blocking component 50 is arranged near the high-temperature first light source module 10 and second light source module 20.

Figure 9:
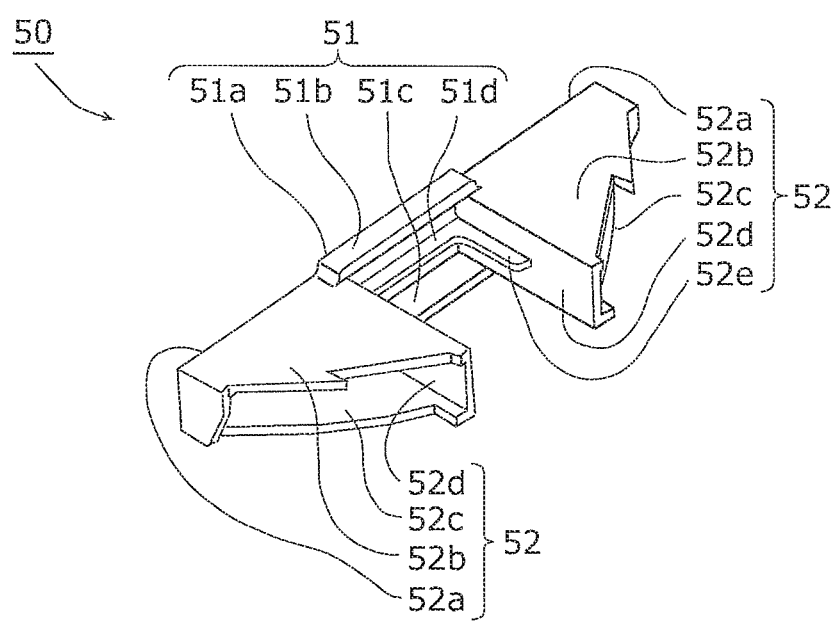
FIG. 9 is a perspective view of the light-blocking component in the light source unit according to an embodiment of the present invention.

Next, a detailed description of the structure of the light-blocking component 50 will be given using FIG. 9. FIG. 9 is a perspective view of the light-blocking component in the light source unit according to an embodiment of the present invention.

As is illustrated in FIG. 4A and FIG. 9, the light-blocking component 50 includes: a central portion 51 connected to a front end portion of the light source arrangement portion 41; and a pair of side portions 52 located on respective sides of the central portion 51 and extending in the left-and-right direction toward the reflector 30.

As is illustrated in FIG. 9, the central portion 51 includes: a front surface portion 51*a* having a front surface that is a planar surface extending in the vertical and left-and-right directions and facing forward; and an upper extension portion 51*b* and lower extension portion 51*c* that extend so as to protrude rearward from the upper end portion and the lower end portion of the front surface portion 51*a*, respectively.

The width of the front surface of the front surface portion 51*a* in the vertical direction is configured to be greater than the width of the front surface of the pair of side portions 52. Moreover, as is illustrated in FIG. 4B, the height of the front surface portion 51*a* is higher than the height of the first light source module 10. In other words, the top edge of the front surface portion 51*a* is positioned higher than the highest part of the first light source module 10. Moreover, the width of the front surface portion 51*a* in the left-and-right direction is greater than the width of the first light source module 10. By configuring the front surface of the front surface portion 51*a* in this way, when viewed from the front, the first light source module 10 is covered by the front surface portion 51*a*.

Similarly in regard to the second light source module 20, when viewed from the front, the second light source module 20 is arranged so as to be covered by the front surface portion 51*a*.

Moreover, the upper extension portion 51*b* and the lower extension portion 51*c* extend to a position overlapping the front end portions of the substrates 11 of the first light source module 10 and the second light source module 20. In the embodiment, since the second light source module 20 is arranged further back than the first light source module 10, the length of the lower extension portion 51*c* is longer than the length of the upper extension portion 51*b*.

Figure 10:
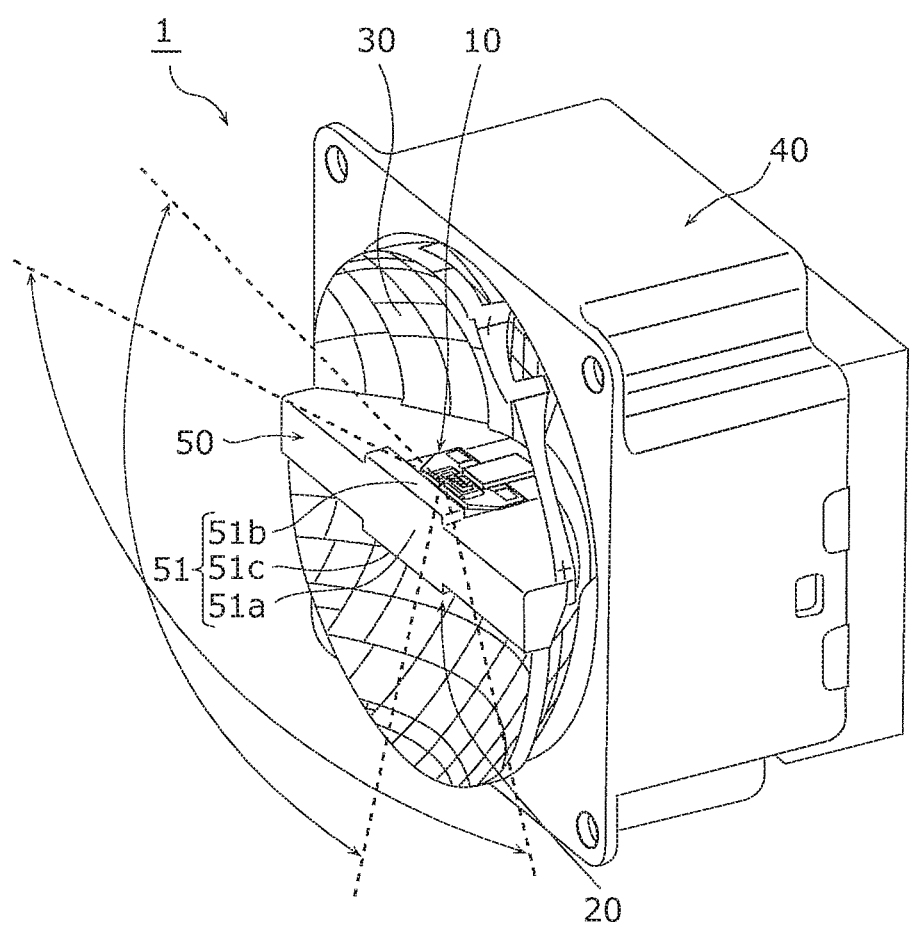
FIG. 10 illustrates the region of the light source module in the light source unit according to an embodiment of the present invention that cannot be seen directly.

By configuring the central portion 51 in this way, since the region in which the light source component (the first light source module 10 and the second light source module 20) is directly seen is restricted, it is possible to reduce being blinded by direct viewing of the light source component, as is illustrated in FIG. 10. It should be noted that FIG. 10 illustrates the region of the light source module in the light source unit according to an embodiment of the present invention that cannot be seen directly.

As is illustrated in FIG. 9, a horizontally long protrusion 51*d* that protrudes rearward is provided on the rearward surface of the central portion 51 (on the back surface of the front surface portion 51*a*). The protrusion 51*d* fits in the groove 41*d* of the light source arrangement portion 41 upon attaching the light-blocking component 50 to the heat sink 40.

Moreover, the pair of side portions 52 include: a front surface portion 52*a* having a front surface that is a planar surface extending in the vertical and left-and-right directions and facing forward; an upper extension portion 52*b* and lower extension portion 52*c* that extend rearward from the upper end portion and the lower end portion of the front surface portion 52*a*, respectively; and an inner surface portion 52*d* connecting a portion of the upper extension portion 52*b* and the lower extension portion 52*c* adjacent to the central portion 51.

As is illustrated in FIG. 4A, the upper extension portion 52*b* and the lower extension portion 52*c* in the side portion 52 extend rearward until contact is made with the reflective surface of the reflector 30, and the rearward edges of the upper extension portion 52*b* and the lower extension portion 52*c* adjacent to the reflector have a shape corresponding to the shape of the reflective surface of the reflector 30. With this, the concave spatial region of the reflector 30 is completely divided into two—upper and lower—spaces by the side portion 52.

Moreover, as is illustrated in FIG. 9, inner surface portions 52*d* in the pair of side portions 52 are provided with protrusions 52*e* that protrude in the left-and-right direction so as to face each other. The protrusion 52*e* is a protruding rail extending in the front-and-back direction, and is provided on the connection portion of the light-blocking component 50 with the light source arrangement portion 41. The protrusion 52*e* is fitted in the groove 41*e* of the light source arrangement portion 41 illustrated in FIG. 5. For example, upon attaching the light-blocking component 50 to the heat sink 40, the protrusion 52*e* (rail) is fitted in the groove 41*e* of the light source arrangement portion 41 and the light-blocking component 50 is slidably inserted into the light source arrangement portion 41 in a rearward direction. In other words, the groove 41*e* is a rail groove configured to receive the protrusion (rail) 52*e*.

With this configuration, the light-blocking component 50 can be fixed to the light source arrangement portion 41 by pushing so as to slide the protrusion 52*e* of the light-blocking component 50 along the groove 41*e* of the light source arrangement portion 41. This makes it possible to both fix and position the light-blocking component 50 and the heat sink 40 at the same time without using, for example, a positioning boss or a separate fixing component, thereby reducing the size and weight of the light source unit 1. Furthermore, the light-blocking component 50 can be rapidly assembled with accurate and simple positioning.

By fitting the protrusion 52*e* of the light-blocking component 50 in the groove 41*e* of the light source arrangement portion 41, the gap between the first light source arrangement portion 41*a* and the second light source arrangement portion 41*b* in the light source arrangement portion 41 can be kept from narrowing by, for example, deformation of the first light source arrangement portion 41*a* or the second light source arrangement portion 41*b*. With this, the relative positioning of the reflector 30 with the first light source module 10 and the second light source module 20 is sustainable.

Moreover, the front surface portion 51*a* of the central portion 51 extends in the vertical direction, and the vertical width of the front surface of the front surface portion 51*a* of the central portion 51 is greater than the vertical direction width of the front surface of the front surface portion 52*a* of the pair side portions 52. It should be noted that the front surface of the front surface portion 51*a* of the central portion 51 is flush with the front surface of the front surface portion 52*a* of the pair of side portions 52.

The light-blocking component 50 configured in this way is arranged further forward than the first light source module 10 and the second light source module 20 and attached to the light source arrangement portion 41, as is illustrated in FIG. 4A and FIG. 4B. More specifically, the light-blocking component 50 is attached to the light source arrangement portion 41 such that the central portion 51 is attached to the front end surface of the light source arrangement portion 41 and the pair of side portions 52 are attached to the left and right side surfaces of the light source arrangement portion 41. At this time, the front end portion of the light source arrangement portion 41 is arranged between the upper extension portion 51*b* and the lower extension portion 51*c* of the central portion 51.

(Holddown Spring)

As is illustrated in FIG. 4A, FIG. 4B, and FIG. 5, the holddown spring 60 is a clamping component (clip) that clamps the first light source module 10 and the second light source module 20 arranged on the light source arrangement portion 41 to the light source arrangement portion 41.

The first light source module 10 and the second light source module 20 are clamped down by the holddown spring 60 while sandwiching the light source arrangement portion 41. With this, the first light source module 10 and the second light source module 20 are fixed to the light source arrangement portion 41. In other words, the holddown spring 60 is a fixing component for simultaneously fixing the first light source module 10 and the second light source module 20 to the light source arrangement portion 41. Fixing the first light source module 10 and the second light source module 20 with a single fixing component reduces the size and weight of the light source unit 1.

The holddown spring 60 according to the embodiment is a U-shaped flat spring, and as is illustrated in FIG. 3 and FIG. 4B, is configured of the plate-shaped first holding portion 61, the plate-shaped second holding portion 62, and a plate-shaped joining portion 63. The first holding portion 61 and the second holding portion 62 are spaced apart by a predetermined distance and joined together by the joining portion 63. The joining portion 63 joins one end of the first holding portion 61 to one end of the second holding portion 62.

The joining portion 63 is provided with a through-hole 63a corresponding to the screw hole 41c1 provided in the rearward surface of the light source arrangement portion 41. The holddown spring screw 91 is inserted in the through-hole 63a upon fixing the holddown spring 60 to the heat sink 40 (light source arrangement portion 41).

This kind of holddown spring 60, which is a flat spring clip, can be formed by, for example, bending a single rectangular metal sheet. The holddown spring 60 according to the embodiment is formed using 0.8 mm thick SUS304.
(Drive Circuit)

The drive circuit (driver) 70 is a circuit unit that controls driving of the first light source module 10 and the second light source module 20. For example, the drive circuit 70 is a light circuit that stably supplies a predetermined power to the first light source module 10 and the second light source module 20 and controls flashing of the first light source module 10 and the second light source module 20. The drive circuit 70, for example, supplies direct current power to the first light source module 10 and the second light source module 20 to cause light emission by (to turn on) one of the first light source module 10 and the second light source module 20. It should be noted that the drive circuit 70 is arranged inside the circuit cover 80.

As is illustrated in FIG. 3, FIG. 4A, and FIG. 4B, the drive circuit 70 includes a circuit substrate (driver substrate) 71 and a plurality of circuit elements (not shown in the Drawings) mounted on the circuit substrate 71. The plurality of circuit elements constitute an electrical circuit for controlling the driving of the first light source module 10 and the second light source module 20.

The circuit substrate 71 is, for example, a printed substrate (PCB substrate) having metal wiring such as copper foil patterned on one main surface (soldering surface) thereof. The plurality of circuit elements are electrically connected together by the metal wiring. A substantially rectangular shaped substrate can be used as the circuit substrate 71, but the circuit substrate 71 is not limited to this shape.

In the embodiment, the circuit substrate 71 is fixed to a base portion 81 of the circuit cover 80 such that the soldering surface of the circuit substrate 71 faces the bottom surface of the base portion 81 of the circuit cover 80.

The drive circuit 70 (circuit substrate 71), first light source module 10, and the second light source module 20 are electrically connected by a plurality of output lead wires (power supply lead wires), for example. For example, a pair of output lead wires for supplying direct current power to the first light source module 10 and a pair of output lead wires for supplying direct power to the second light source module 20 are fed out from the drive circuit 70 and electrically connected to the first light source module 10 and the second light source module 20 through the insertion hole 42c.

It should be noted that the drive circuit 70 is not directly attached to the heat sink 40, but retained indirectly by the heat sink 40. More specifically, the circuit cover 80 housing the drive circuit 70 is attached to the heat dissipating portion 43 of the heat sink 40, and the drive circuit 70 is attached to the back surface of the heat sink 40 via the circuit cover 80.
(Circuit Cover)

As is illustrated in FIG. 4A and FIG. 4B, the circuit cover (driver cover) 80 is configured so as to cover the drive circuit 70. The circuit cover 80 according to the embodiment is a circuit case and retains the drive circuit 70 while housing the drive circuit 70. The circuit cover 80 can be made of, for example, metal, but may also be made of resin.

As is illustrated in FIG. 3, the circuit cover 80, for example, is box-shaped and has an open portion 80a. The circuit cover 80 includes: the rectangular plate-shaped base portion (base panel) 81 having the circuit substrate 71 of the drive circuit 70 fixed thereto; and the side wall portion 82 surrounding the entire perimeter of the base portion 81.

The side wall portion 82 includes four plate-shaped components standing vertically at the four sides of the base portion 81. The side wall portion 82 according to the embodiment includes the top wall (top panel) 82a, the bottom wall (bottom panel) 82b, the right wall (right panel) 82c, and the left wall (left panel) 82d. It should be noted that the top wall 82a and the bottom wall 82b are positioned opposite each other, and the right wall 82c and the left wall 82d are positioned opposite each other.

In the embodiment, the adjacent portions (portions of the meeting points) of the top wall 82a, the bottom wall 82b, the right wall 82c, and the left wall 82d are not welded, for example, and are not joined together. With this, a slight gap is present between adjacent portions of the top wall 82a, the bottom wall 82b, the right wall 82c, and the left wall 82d.

Moreover, the right wall 82c and the left wall 82d are each provided with a pair of clasps 82c1 and 82d1. The clasps 82c1 and 82d1 are each formed by bending a portion of the right wall 82c and the left wall 82d outward twice. The clasps 82c1 and 82d1 are bent such that they contact the outer surface of the outermost heat dissipation fins 43a in the left-and-right direction. With this, the positioning of the circuit cover 80 and the heat dissipation fins 43a in the left-and-right direction is determined, as is illustrated in FIG. 1A and FIG. 1B.

Moreover, as is illustrated in FIG. 3, (d) in FIG. 2, and (e) in FIG. 2, the right wall 82c and the left wall 82d are provided with the protrusions 82c2 and 82d2, respectively. The protrusions 82c2 and 82d2 latch onto the through-holes 43a3 provided in the outermost heat dissipation fins 43a in the left-and-right direction, as is illustrated in FIG. 1A and FIG. 1B. This makes it possible to fix the circuit cover 80 to the heat dissipating portion 43. The size of the protrusions 82c2 and 82d2 according to the embodiment are roughly the same as the size of the through-holes 43a3, and the protrusions 82c2 and 82d2 are configured to engage the through-holes 43a3 from the inner side of the heat dissipation fins 43a.

The circuit cover 80 configured in this way is fixed such that the open portion 80a faces the heat dissipation fins 43a and the circuit cover 80 covers the back surface of the heat sink 40, as is illustrated in FIG. 1B, FIG. 4A, and FIG. 4B. More specifically, the end portion of the top wall 82a engages the groove 43a1 in each heat dissipation fin 43a, and the bottom wall 82b is latched to the notch 43a2 of the heat dissipation fins 43a. Moreover, the protrusions 82c2 and 82d2 on the right wall 82c and the left wall 82d engage the through-holes 43a3 in each of the outermost heat dissipation fins 43a in the left-and-right direction. This makes it possible to fix the circuit cover 80 to the heat dissipation fins 43a.

In this way, in the embodiment, the circuit cover 80 retaining the drive circuit 70 is fixed to the heat dissipation fins 43a. In other words, the drive circuit 70 and the circuit cover 80 are fixed to the back surface of the heat sink 40. With this, similar to Japanese Unexamined Patent Application Publication No. 2013-030371, since the length of the heat sink in the depthwise direction can be reduced, it is possible to keep the heat sink from becoming heavier, compared to when the drive circuit is provided on the front surface of the heat sink.

However, in the embodiment, the first light source module 10 and the second light source module 20 are fixed to the front surface of the heat sink 40, and moreover, the first light source module 10 and the second light source module 20 are electrically connected to the drive circuit 70 via a connecting cable such as a lead wire. In other words, the driver unit (the drive circuit 70 and the circuit cover 80) and the light source component (the first light source module 10 and the second light source module 20) are not separate components, but are attached to a single component (the heat sink 40). This makes it possible to reduce man hours and costs. Moreover, it is possible to reduce the size and weight of the light source unit 1 since a plurality of connection cables in accordance with the layout are not necessary due to the reduction in the number of parts.

Moreover, in the embodiment, the open portion 80a of the circuit cover 80 is fixed to the heat dissipation fins 43a so as to face the heat dissipation fins 43a.

Moreover, in the embodiment, the end portion of top wall 82a of the circuit cover 80 engages the groove 43a1 of the heat dissipation fins 43a. This makes it possible to easily fix, to the heat dissipation fins 43a, the circuit cover 80 including the open portion 80a adjacent to the heat dissipation fins 43a. This further makes it possible to easily restrict the positioning of the circuit cover 80.

(Light Source Unit Functionality Example)

Next, an example of the functionality of the light source unit 1 according to the embodiment will be given.

As described above, with the light source unit 1 according to the embodiment, at least a portion of the reflector 30 is located in the concave portion 42 of the heat sink 40.

With this configuration, compared to arranging the reflector 30 in a position on the front side of a heat sink not provided with the concave portion 42, the length of the heat sink 40 in the depthwise direction can be reduced. This makes it possible to keep the weight of the heat sink 40 from increasing.

Moreover, with the light source unit 1 according to the embodiment, a predetermined gap (void) is present between the reflector 30 and the concave portion 42 of the heat sink 40. More specifically, as is illustrated in FIG. 4A and FIG. 4B, the back surface of the reflector 30 and the front surface (inner surface) of the concave portion 42 are distanced so as to have a gap therebetween. Furthermore, this gap is a region framed by substantially spherical surfaces and is configured to allow outside air to flow through. In the embodiment, the gap is present almost throughout the entire region between the back surface of the reflector 30 and the inner surface of the concave portion 42 of the heat sink 40, and the gap acts as a flow passageway whereby air can flow therethrough in four directions: up, down, left, and right.

Figure 11:
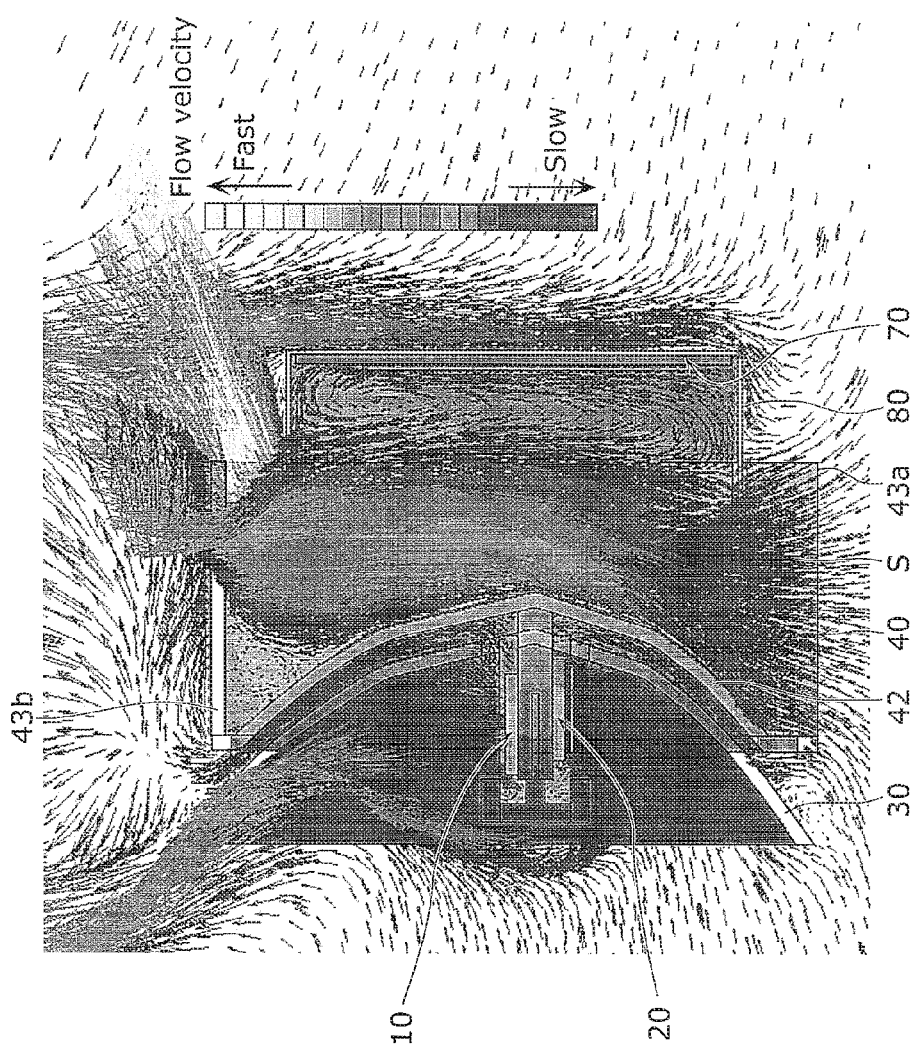
FIG. 11 is a simulation of natural convection in the area surrounding the light source unit according to an embodiment of the present invention.

With this configuration, as is illustrated in FIG. 11, a passageway through which air can flow by natural convection forms even in the gap between the reflector 30 and the heat sink 40. FIG. 11 is a simulation of natural convection in the area surrounding the light source unit according to an embodiment of the present invention.

In this way, even if the front surface of the heat sink 40 is covered by the reflector 30, by providing a gap between the reflector 30 and the heat sink 40, the front surface portion of the heat sink 40—in other words, the portion of the heat sink 40 adjacent the light source module (adjacent the heat source)—can be effectively cooled. This makes it possible to increase the ability of the heat sink 40 to dissipate heat. As a result, it possible to effectively dissipate the heat generated by the first light source module 10 and the second light source module 20.

It should be noted that in the embodiment, the shape of the inner surface of the concave portion 42 and the shape of the outer surface of the reflector 30 are substantially the same, and the gap between the heat sink 40 and the reflector 30 is substantially constant throughout, but this example is not limiting.

Moreover, with the light source unit 1 according to the embodiment, a spatial region S expanding in the up-and-down direction is formed between adjacent ones of the heat dissipation fins 43a, as is illustrated in FIG. 1B and FIG. 4B.

In this case, since a top panel (heat dissipation panel) 43b is provided on the upper portion of the heat dissipation fins 43a so as to straddle the heat dissipation fins 43a, the portion directly above the spatial region S is blocked off by the top panel 43b, but with the light source unit 1 according to the embodiment, the circuit cover 80 is attached to the heat dissipation fins 43a such that at least two ventilation holes (openings) are present in the spatial region S framed by adjacent ones of the heat dissipation fins 43a and the circuit cover 80. In the embodiment, the circuit cover 80 is attached to the heat dissipation fins 43a such that two ventilation holes are present in a direction (vertical direction) intersecting the arrangement direction (left-and-right direction) of the heat dissipation fins 43a.

More specifically, after the circuit cover 80 is attached to the heat dissipation fins 43a (the heat sink 40), a major portion of the rearward side of the plurality of spatial regions S is blocked off by the circuit cover 80, but as is illustrated in FIG. 1B, even after the circuit cover 80 has been attached to the heat sink 40, the upper portion of the rearward side of each spatial region S is provided with a first ventilation hole (first opening). In other words, with regard to the upper region of each spatial region S, the portion directly above is closed off by the top panel 43b, but the rearward upper portion is opened and a ventilation hole communicating with each spatial region S is present.

On the other hand, as is illustrated in (c) in FIG. 2 and FIG. 4B, since the lower portion of the heat dissipation fins 43a is not provided with heat dissipation panels, even after the circuit cover 80 has been attached to the heat sink 40, the lower region of each spatial region S is opened and a second ventilation hole (second opening) is present.

In this way, in the embodiment, even after the circuit cover 80 has been attached to the heat sink 40, openings (ventilation holes) which allow for ventilation in two locations—top and bottom—are provided at the spatial regions S between heat dissipation fins 43a. In other words, in each spatial region S, the first ventilation hole is present in the upper region, and the second ventilation hole is present in the lower region.

With this configuration, in the spatial region S, it is possible to achieve natural convection of air from the bottom up via the first ventilation hole in the upper region the second ventilation hole in the lower region, as is illustrated in FIG. 11.

With this, even in a configuration in which the back surface of the heat sink 40 is covered by the circuit cover 80, it is possible to effectively cool the back surface of the heat sink 40 and effectively dissipate heat transferred to the heat sink 40 to the outside. This makes it possible to effectively dissipate the heat generated by the first light source module 10 and the second light source module 20.

In this way, with the embodiment, back surface side and front surface side portions of the heat sink 40 are cooled by natural convection. This makes it possible to effectively dissipate the heat transferred to the heat sink 40. In particular, since the vehicle front lamp is hermetically sealed and thereby substantially absent of air flow, it is possible to effectively dissipate heat generated by the first light source module 10 and the second light source module 20 and heat generated by the drive circuit 70 by cooling the heat sink 40 with natural convection in the manner described above.

It should be noted that in the embodiment, the top panel 43b is provided on the upper portion of the heat dissipation fin 43a, but provision of the top panel 43b is not required. By omitting the top panel 43b, the ability of the heat sink 40 to dissipate heat improves since air can flow straight in the vertical direction.

However, by providing the top panel 43b, it is possible to prevent the user's finger from entering the gap between adjacent ones of the heat dissipation fins 43a upon attaching the light source unit 1 to the housing of the vehicle front lamp. With this, even if the drive circuit 70 is present near the heat dissipation fins 43a such as is the case in the embodiment, it is possible to prevent the user from touching the recharging portion of the drive circuit 70 when attaching (replacing) the light source unit 1, thereby making attaching the light source unit 1 more safe. Furthermore, by providing the top panel 43b, reduction of foreign matter such as dust or liquid such as water or oil droplets entering the driver unit (the drive circuit 70 and the circuit cover 80) can also be achieved. This makes it possible to achieve a reliable light source unit.

Moreover, in the embodiment, the plate-shaped plurality of heat dissipation fins 43a extending in the vertical direction are arranged in the left-and-right direction, but they may be arranged in any direction. For example, plate-shaped plurality of heat dissipation fins 43a extending in the left-and-right direction may be arranged in the vertical direction.

However, since heat rises, by providing plate-shaped plurality of heat dissipation fins 43a extending in the vertical direction (up-and-down direction) are arranged in the left-and-right direction, such as is the case in the embodiment, it is possible realize a more smooth flow of air due to natural convection.

Moreover, with the light source unit 1 according to the embodiment, the open portion 80a of the circuit cover 80 is fixed to the heat dissipation fins 43a so as to face the heat dissipation fins 43a. With this, as is illustrated in FIG. 4B, the spatial region S formed by the heat dissipation fins 43a and the region surrounding the drive circuit 70 can be spatially coupled, and the spatial region framed by the heat dissipation fins 43a and the circuit cover 80 can be enlarged.

With this, air can easily circulate by natural convection through the openings in the upper region and the lower region of the spatial region S, and the cooling efficiency of the heat sink 40 and the drive circuit 70 can be increased.

Furthermore, with the light source unit 1 according to the embodiment, as described above, the circuit substrate 71 is fixed to a base portion 81 of the circuit cover 80 such that the soldering surface of the circuit substrate 71 faces the bottom surface of the base portion 81 of the circuit cover 80. In other words, the circuit substrate 71 is arranged such that the surface (the component mounting surface) on the opposite side of the soldering surface faces the heat sink 40. Moreover, in the embodiment, molded resin for covering the entire circuit element is not formed in the circuit cover 80.

With this, it is possible to make a natural convection occur easily in the spatial region between the heat sink 40 (heat dissipation fins 43a) and the circuit cover 80 (drive circuit 70), and possible to directly cool the circuit element with air cooling since the circuit element can be exposed to the air in the spatial region. As such, it is possible to effectively dissipate heat generated by the circuit element via the spatial region S and effectively dissipate heat generated by the drive circuit 70.

Moreover, with the light source unit 1 according to the embodiment, as is illustrated in FIG. 1B, even after the circuit cover 80 is fixed to the heat dissipation fins 43a, ventilation holes (openings) communicating with the spatial region S are present between the rightmost heat dissipation fin 43a and the right wall 82c and between the left-most heat dissipation fin 43a the left wall 82d.

With this, it is possible for air to flow in and out through the ventilation holes (openings) as well, so it is possible to make a natural convection occur easily in the spatial region S.

Moreover, as described above, with the light source unit 1 according to the embodiment, the portions of the meeting points of the four walls of the side wall portion 82 are not joined together, and a slight gap is present at the meeting points between adjacent ones of the top wall 82a, the bottom wall 82b, the right wall 82c, and the left wall 82d.

With this, the gap functions as a ventilation hole, and air can flow in and out of this gap. As such, it is possible to make natural convection occur even more easily in the spatial region S.

Moreover, with the light source unit 1 according to the embodiment, the opening (ventilation hole) 82b1 is formed in the bottom wall 82b, as is illustrated in (c) in FIG. 2 and FIG. 3.

This makes it possible to cool the drive circuit 70 since air can flow in through the opening 82b1. In particular, with the embodiment, as is described above, the spatial region S formed by the heat dissipation fins 43a and the region surrounding the drive circuit 70 are spatially coupled, and the upper portion of the spatial region S is opened to allow air to flow by natural convection. This makes it possible to effectively cool the drive circuit 70 since air flows in through the opening 82b1.

(Light Source Unit Second Functionality Example)

Next, a second example of the functionality of the light source unit 1 according to the embodiment will be given in detail, along with the developments that resulted in the present invention, using FIG. 12A, FIG. 12B, and FIG. 13.

Figure 12A:
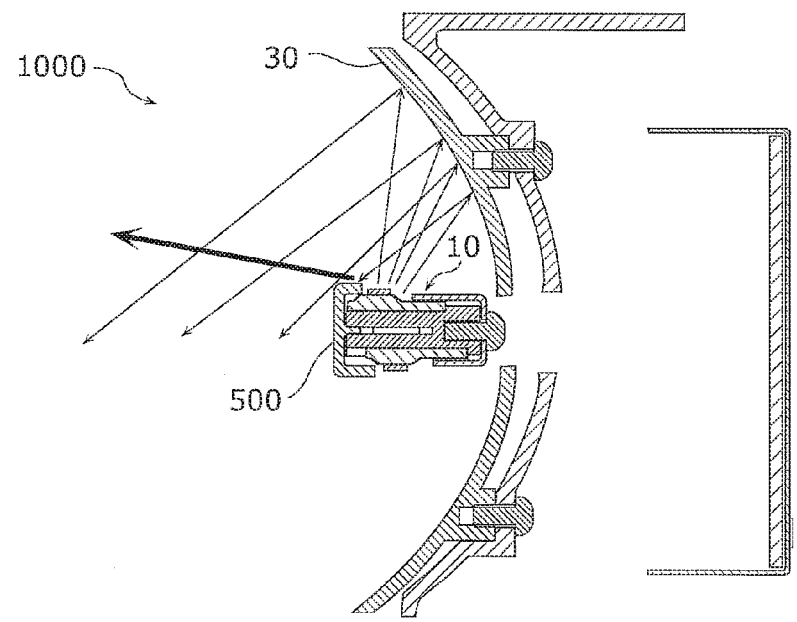
FIG. 12A is a cross-sectional view illustrating light ray paths when the low beam is used in the light source unit according to a comparative example.

FIG. 12A is a cross-sectional view illustrating light ray paths when the low beam is used in the light source unit according to a comparative example. FIG. 12B is a cross-sectional view illustrating light ray paths when the low beam is used in the light source unit according to an embodiment of the present invention. FIG. 13 illustrates the beam pattern of the low beam in the light source unit according to a comparative example and an embodiment of the present invention. More specifically, in FIG. 13, (a1) illustrates the distribution of light on the road with the light source unit according to the comparative example, (a2) illustrates the vertical illuminance of the light source unit according to the comparative example, (b1) illustrates the distribution of light on the road with the light source unit 1 according to the embodiment, and (b2) illustrates the vertical illuminance of the light source unit according to the embodiment. It should be noted that only a cross-section of the light distribution is illustrated in FIG. 12A and FIG. 12B. The distribution in the depthwise direction (vertical direction on paper) is not illustrated.

The light source unit 1000 according to the comparative example illustrated in FIG. 12A is the light source unit 1 according to the embodiment when the surface of the light-blocking component is a mirrored surface, and includes a light-blocking component 500 treated to have a mirrored surface. Moreover, each beam pattern in FIG. 13 indicates the low-beam beam pattern when the light source unit is installed in an automobile headlamp (vehicle front lamp). As such, the reflector has a shape that darkens the right side of the beam pattern to prevent glare for oncoming traffic (in other words, the illumination on the side of oncoming traffic is low) and illuminates the right side to make pedestrians easy to see. Moreover, (a1) and (b1) illustrate beam patterns when the road is illuminated, as seen from above, and (a2) and (b2) illustrate beam patterns when a wall is illuminated.

As is illustrated in (a1) in FIG. 13, it was found that with the light source unit 1000 according to the comparative example, unwanted light is generated relative to the desired pattern, causing glare for oncoming traffic. Moreover, as is illustrated in (a2) in FIG. 13, it was found that areas that should be dark are actually illuminated, causing the cut-off line to appear blurry. In this way, it was found that a desired beam pattern cannot be obtained with the light source unit 1000 according to the comparative example. In particular, it was found that a desired beam pattern cannot be obtained with the low beam, on which cut-off line adjustment is performed.

As a result of diligent examination on the part of the inventors, the light-blocking component 500 treated to have a mirrored surface, which was believed to be effective, was found to be the cause of the above-described problem. In other words, it was found that the light reflected by the light-blocking component 500 are not effective beams, but rather appeared as null beams (unwanted light; light having an adverse effect). For example, as is illustrated in FIG. 12A, it was found that light arriving at the light-blocking component 500 is reflected when the low beam is used in the light source unit 1000 according to the comparative example.

The present invention has been conceived, based on this underlying knowledge, to achieve a desired beam pattern by reducing the reflection of light off the surface of the light-blocking component in light source module.

As such, in the embodiment, the surface of the light-blocking component 50 is configured to reduce reflection of light. More specifically, the surface of the light-blocking component 50 is black, which is a color capable of efficiently absorbing white light. With this, the light emitted from the first light source module 10 and the second light source module 20 that arrives at the light-blocking component 50 can be absorbed by the surface of the light-blocking component 50, thereby reducing the reflection of light.

Figure 12B:
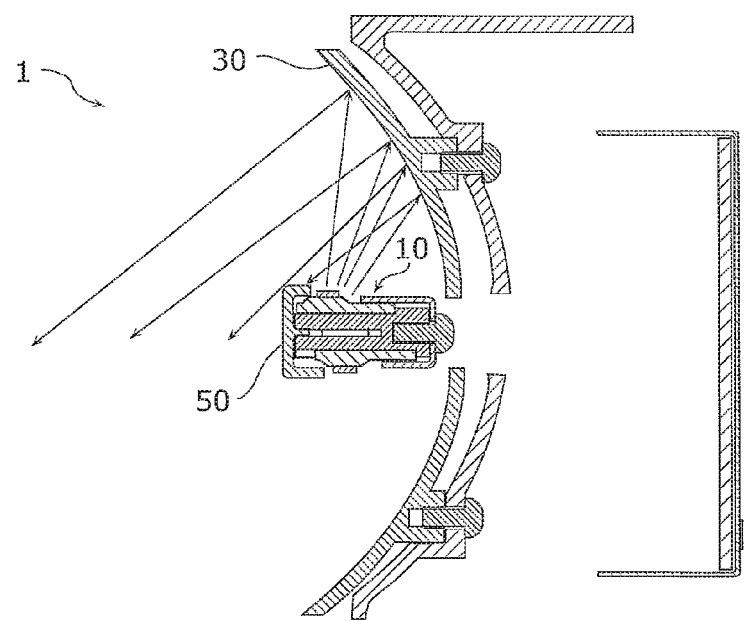
FIG. 12B is a cross-sectional view illustrating light ray paths when the low beam is used in the light source unit according to an embodiment of the present invention.

For example, as is illustrated in FIG. 12B, when the low beam is used in the light source unit 1 according to the embodiment, the light arriving at the light-blocking component 50 is absorbed by the light-blocking component 50, making it possible to reduce the reflection of light.

As a result, it is possible to reduce the generation of unwanted light and reduce glare for oncoming traffic, as is illustrated in (b1) in FIG. 13. Moreover, it is possible to achieve a clear cut-off line since the areas that should be dark are actually dark, as is illustrated in (b2) in FIG. 13. In this way, with the light source unit 1 according to the embodiment, it is possible to achieve a desired beam pattern. In particular, it is possible to achieve a desired beam pattern with the low beam.

Furthermore, in the embodiment, the light-blocking component 50 is treated to degloss the surface thereof.

This makes it possible to further reduce the reflection of light off the surface of the light-blocking component 50, thereby achieving a highly accurate desired beam pattern.

Moreover, in the embodiment, the front surface of the central portion 51 (the front surface portion 51a) of the light-blocking component 50 has a vertical width that is greater than the vertical width of the front surface of the side portion 52, and when viewed from the front, the first light source module 10 and the second light source module 20 are covered by the central portion 51 (the front surface portion 51a).

With this configuration, since the region in which the light source component (the first light source module 10 and the second light source module 20) is directly seen is restricted, it is possible to reduce being blinded by direct viewing of the light source component, as is illustrated in FIG. 10.

Furthermore, in the embodiment, an extension portion (the upper extension portion 51b and lower extension portion 51c) extending rearward is provided on the central portion 51 of the light-blocking component 50, as is illustrated in FIG. 4B.

With this configuration, since the region in which the light source component (the first light source module 10 and the second light source module 20) is directly seen, not only from the front but from an angle as well, is restricted, it is possible to reduce blinding by direct viewing of the light source component even further.

Moreover, in the embodiment, the groove 41e is formed in the side surface of the light source arrangement portion 41 of the heat sink 40, as is illustrated in FIG. 8A. Additionally, the protrusion 52e functioning as a protruding rail is formed on the inner surface portion 52d of the side portion 52 of the light-blocking component 50, as is illustrated in FIG. 9. With this, by fitting the protrusion 52e and the groove 41e together, the light-blocking component 50 is slidably insertable into the light source arrangement portion 41.

With this configuration, the light-blocking component 50 can be fixed to the light source arrangement portion 41 by pushing so as to slide the protrusion 52e of the light-blocking component 50 along the groove 41e of the light source arrangement portion 41. This makes it possible to both fix and position the light-blocking component 50 and the heat sink 40 at the same time without using, for example, a positioning boss or a separate fixing component, thereby reducing the size and weight of the light source unit 1. Furthermore, the light-blocking component 50 can be rapidly assembled with accurate and simple positioning.

By fitting the protrusion 52e of the light-blocking component 50 in the groove 41e of the light source arrangement portion 41, the gap between the first light source arrangement portion 41a and the second light source arrangement portion 41b in the light source arrangement portion 41 can be kept from narrowing by, for example, deformation of the first light source arrangement portion 41a or the second light source arrangement portion 41b. With this, the relative positioning of the reflector 30 with the first light source module 10 and the second light source module 20 is sustainable.

(Light Source Unit Third Functionality Example)

Next, a third example of the functionality of the light source unit 1 according to the embodiment will be given.

With the light source unit 1 according to the embodiment, the portion of the light source arrangement portion 41 of the heat sink 40 between the first light source module 10 and the second light source module 20 has a gap of a predetermined length. More specifically, as is illustrated in FIG. 4A, FIG. 4B, and FIG. 5, a gap is provided between the first light source arrangement portion 41a and the second light source arrangement portion 41b of the light source arrangement portion 41, and the gap is directly below the first light source module 10 and directly above the second light source module 20.

Moreover, the gap defined by the first light source arrangement portion 41a and the second light source arrangement portion 41b extends in the horizontal direction, and the region in which the gap is present is greater than the region sandwiched by the first light source module 10 (substrate) and the second light source module 20 (substrate).

With this configuration, since the gap between the first light source arrangement portion 41a and the second light source arrangement portion 41b functions as a heat-insulating barrier of air, it is possible to reduce the effect heat generated by each of the first light source module 10 and the second light source module 20 has on the other. For example, it is possible to reduce the transfer of heat generated by one of the first light source module 10 and the second light source module 20 to the other.

This makes it possible to achieve a compact, light-weight light source unit 1 since it is possible to arrange the first light source module 10 and the second light source module 20 to be closer together. Moreover, since the effect heat has on each other can be reduced, the lifespan of the first light source module 10 and the second light source module 20 can be increased.

In particular, when the first light source module 10 and the second light source module 20 emit light at the same time, the temperature increases evenly due to the respectively generated heat, and so this advantageous effect is great.

In the embodiment, the distance of the gap defined by the first light source arrangement portion 41a and the second light source arrangement portion 41b (the distance of the gap in the portion of the light source arrangement portion 41 sandwiched by the first light source module 10 and the second light source module 20) is preferably within the range 0.5 mm to 2.0 mm. When the gap is less than 0.5 mm, there is a possibility that the gap will close in the case of, for example, physical impact. On the other hand, when the gap is greater than 2.0 mm, it is difficult to make the size of the light source unit 1 compact. Moreover, it is further preferable that the gap be within a range of 1.0 mm to 1.5 mm. This makes it easier to insert, for example, a portion of the light-blocking component 50 in the gap.

Moreover, in the embodiment, the groove 41d is provided in the front end portion of the light source arrangement portion 41. In other words, the first light source arrangement portion 41a and the second light source arrangement portion 41b are joined together in the rearward portion by the joining portion 41c, and are not joined together in the frontward portion.

With this, it is possible to reduce the generation of a pool of heat forming in the front end portion of the light source arrangement portion 41, and possible to effectively draw heat generated by the first light source module 10 and the second light source module 20 rearward with the first light source arrangement portion 41a and the second light source arrangement portion 41b.

Figure 14:
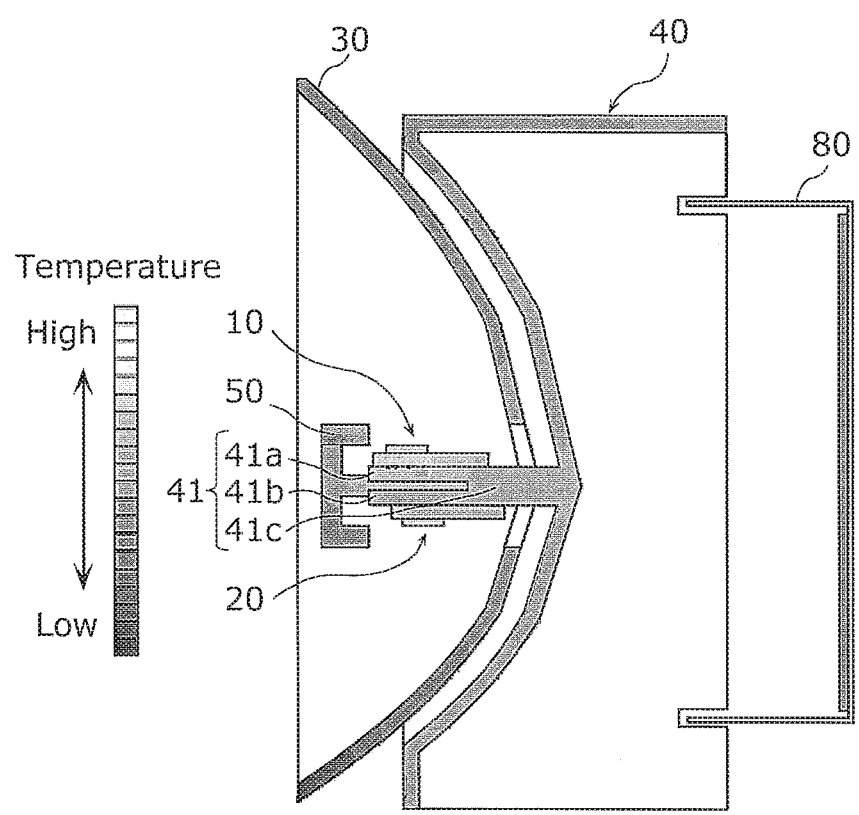
FIG. 14 is a simulation of the heat distribution in the vicinity of the light source component of the light source unit according to an embodiment of the present invention.

Next, a description of the heat distribution in the vicinity of the light source component of the light source unit 1 according to the embodiment will be given using FIG. 14. FIG. 14 is a simulation of the heat distribution in the vicinity of the light source component of the light source unit according to an embodiment of the present invention. It should be noted that FIG. 14 illustrates the heat distribution when only the first light source module 10 is caused to emit light.

As is illustrated in FIG. 14, the heat generated by the first light source module 10 is transferred to the rearward portion of the heat sink 40. Moreover, as can be seen from the heat distribution in the light source arrangement portion 41 illustrated in FIG. 14, although the heat generated by the first light source module 10 is transferred to both the first light source arrangement portion 41a and the second light source arrangement portion 42b, the heat is transferred more to the rearward portion of the first light source arrangement portion 41a than the rearward portion of the second light source arrangement portion 42b. In other words, this shows that it is possible to reduce the effect heat generated by the first light source module 10 has on the second light source module 20.

(Light Source Unit Fourth Functionality Example)

Next, a fourth example of the functionality of the light source unit 1 according to the embodiment will be given.

The heat sink 40 according to the embodiment includes the light source arrangement portion 41 on the front surface side and the heat dissipating portion 43 (heat dissipation fins 43a) on the back surface side. Furthermore, the circuit cover 80 having the drive circuit 70 arranged therein is attached to the rearward side of the heat dissipation fins 43a. In this way, with the light source unit 1 according to the embodiment, the light source component (the first light source module 10 and the second light source module 20) is arranged on the front surface side of the heat sink 40, and the drive circuit 70 is provided on the back surface side of the heat sink 40.

This allows the drive circuit 70 to be relatively unaffected by the heat generated by the light source component (the first light source module 10 and the second light source module 20). Moreover, the length of the heat sink 40 in the depthwise direction can be reduced by providing the drive circuit 70 on the back surface side of the heat sink 40, whereby the weight of the heat sink 40 can be kept from increasing.

Moreover, the heat dissipation fins 43a are constituted of a plurality of plate-shaped components arranged along the first direction such that the main surfaces thereof face each other. The heat dissipation fins 43a according to the embodiment are arranged along the left-and-right direction. With this, as is illustrated in FIG. 4B, a spatial region S expanding in the up-and-down direction is formed between adjacent ones of the heat dissipation fins 43a.

With the light source unit 1 according to the embodiment, it is possible to increase the ability of the heat sink 40 to dissipate heat due to the circulation of air in the surrounding region of the heat dissipation fins 43a, and thus reduce the effect the heat from the light source component (the first light source module 10 and the second light source module 20) has on the drive circuit 70 and reduce the depthwise dimension length of the heat sink 40.

(Light Source Unit Fifth Functionality Example)

Next, a fifth example of the functionality of the light source unit 1 according to the embodiment will be given.

When fixing the first light source module 10 and the second light source module 20 to the light source arrangement portion 41 using the holddown spring 60, the holddown spring 60 is inserted through the insertion hole 42c of the concave portion 42 from behind the concave portion 42 of the heat sink 40, and clamps down the first light source module 10 and the second light source module 20, as is illustrated in FIG. 4B.

More specifically, the joining portion 63 is made to face the rearward end portion of the light source arrangement portion 41, and each of the first holding portion 61 and the second holding portion 62 are inserted through respective ones of two insertion holes 42c. The holddown spring 60 is pushed forward while the first holding portion 61 is in contact with the surface of the substrate 11 of the first light source module 10 and the second holding portion 62 is in contact with the surface of the substrate 11 of the second light source module 20.

At this time, the elastic force from insertion of the first light source module 10 and the second light source module 20 between the first holding portion 61 and the second holding portion 62 applies a pressing force to the first light source module 10 and the second light source module 20. For example, by making the gap between the first holding portion 61 and the second holding portion 62 smaller than the gap between the surface of the substrate of the first light source module 10 and the surface of the substrate of the second light source module 20, the gap between the first holding portion 61 and the second holding portion 62 widens when the holddown spring 60 sandwiches the first light source module 10 and the second light source module 20. At this time, the spring returning force of the holddown spring 60 applies a pressing force to the first light source module 10 and the second light source module 20. With this, the substrate 11 of the first light source module 10 is held down on the light source arrangement portion 41 by the first holding portion 61. Similarly, the substrate 11 of the second light source module 20 is held down on the light source arrangement portion 41 by the second holding portion 62.

Moreover, when the holddown spring 60 is pushed forward (pushed toward the front end portion side of the light source arrangement portion 41), the pushing of the holddown spring 60 in a forward direction applies a force acting to move the first light source module 10 and the second light source module 20 forward, but the protrusions 41a2 and 41b2 (see FIG. 5) provided on the light source arrangement portion 41 function as stoppers keeping the first light source module 10 and the second light source module 20 from moving forward.

With this, only the holddown spring 60 moves forward in such a manner that the first holding portion 61 and the second holding portion 62 glide over the surfaces of the substrates 11 of the first light source module 10 and the second light source module 20. As a result, the first light source module 10 and the second light source module 20 are pushed down on the light source arrangement portion 41 by the holddown spring 60 and thereby fixed to the light source arrangement portion 41. In other words, the pushing down force by the holddown spring 60 makes it possible to restrict the positions of the first light source module 10 and the second light source module 20.

Moreover, after the holddown spring 60 is pushed until the joining portion 63 abuts the rearward surface of the light source arrangement portion 41, the holddown spring screw (fixing component) 91 is inserted through the through-hole 63a from behind and screwed into the screw hole 41c1 provided in the back surface of the light source arrangement portion 41. This makes it possible to fix the holddown spring 60 and the light source arrangement portion 41 together with a screw.

It should be noted that in the embodiment, since the first light source module 10 is arranged to be positioned more forward than the second light source module 20, the length of the first holding portion 61 is longer than the length of the second holding portion.

In this way, with the light source unit 1 according to the embodiment, the first light source module 10 and the second light source module 20 can be simultaneously fixed to the light source arrangement portion 41 with a single holddown spring 60.

This makes it possible to reduce the number of fixing components since there is no need to individually fix the first light source module 10 and the second light source module 20 with separate fixing components. Moreover, it is possible to reduce the number of steps for fixing the first light source module 10 and the second light source module 20 to the heat sink 40, thereby simplifying the process.

It should be noted that in the embodiment, the holddown spring 60 is fixed to the light source arrangement portion 41 with the holddown spring screw 91, but the holddown spring screw 91 is not required to be used. In other words, the holddown spring 60 may be fixed to the light source arrangement portion 41 with only the elastic force of the holddown spring 60. However, using the holddown spring screw 91 to fix the holddown spring 60 to the light source arrangement portion 41 allows for the holddown spring 60 to be more securely fixed to the light source arrangement portion 41, thereby preventing separation of the holddown spring 60.

Figure 15:
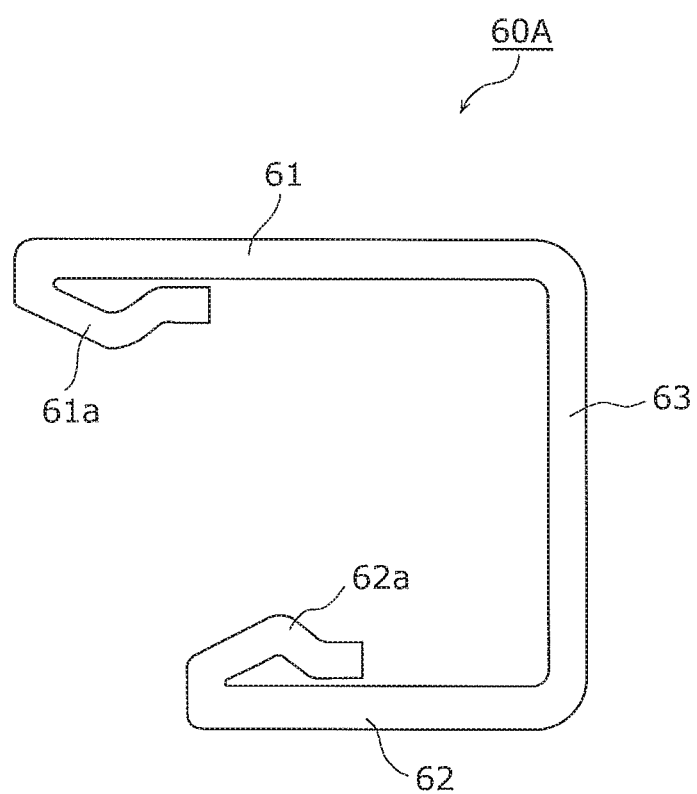
FIG. 15 a cross-sectional view of a modified example of the holddown spring in the light source unit according to an embodiment of the present invention.

Moreover, the shape of the holddown spring 60 is not limited to the example illustrated in FIG. 3. For example, a holddown spring 60A having the shape illustrated in FIG. 15 may be used. The holddown spring 60A illustrated in FIG. 15 includes a folded back portion 61a and a folded back portion 62a. The folded back portion 61a is formed by folding back the leading end portion of the first holding portion 61 inward, and the folded back portion 62a is formed by folding back the leading end portion of the second holding portion 62 inward. The folded back portions 61a and 62a are in contact with the substrates 11 of the first light source module 10 and the second light source module 20. The first light source module 10 and the second light source module 20 are clamped in place by the folded back portions 61a and 62a.

(Light Source Unit According to First Modified Embodiment)

Figure 16A:
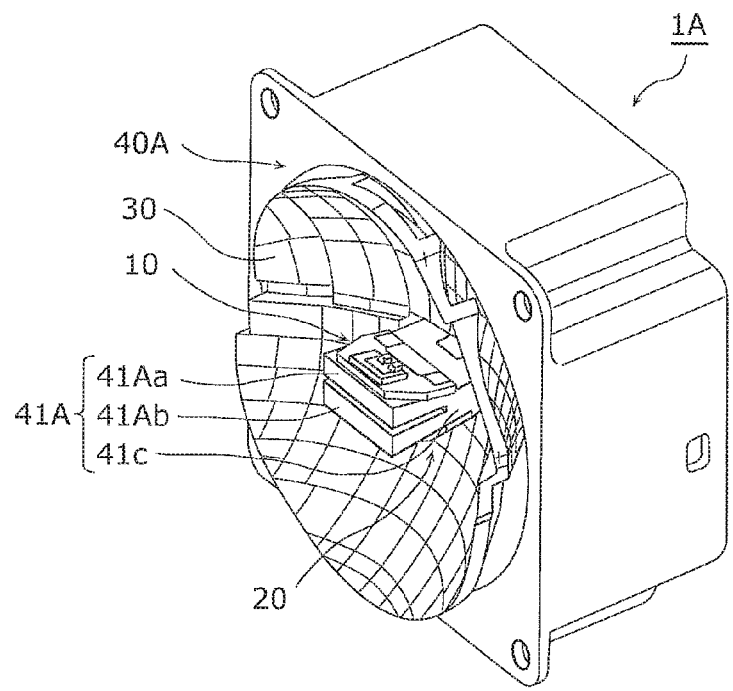
FIG. 16A is a perspective view of the light source unit according to the first modified embodiment of the present invention.
Figure 16B:
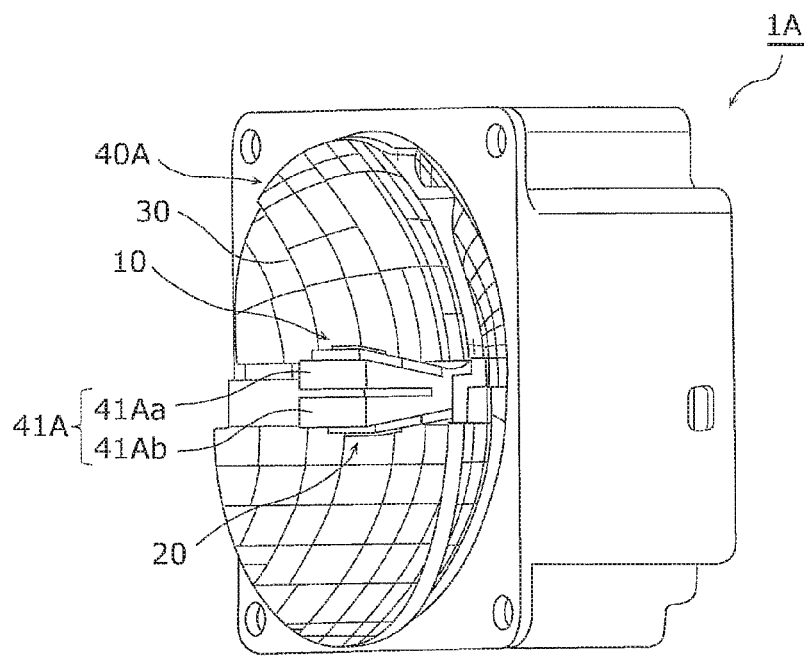
FIG. 16B is a perspective view of the light source unit according to the first modified embodiment of the present invention.

Next, a light source unit 1A according to the first modified embodiment of the present invention will be described using FIG. 16A and FIG. 16B. FIG. 16A and FIG. 16B are perspective views of the light source unit according to the first modified embodiment of the present invention.

The light source unit 1A according to the first modified embodiment differs from the light source unit 1 according to the above embodiment in regard to the configuration of the light source arrangement portion in the heat sink and the arrangement of the light source module. It should be noted that all other configurations are similar to the light source unit 1 according to the above embodiment, and as such, descriptions thereof are omitted.

As is illustrated in FIG. 16A and FIG. 16B, with the light source unit 1A according to the first modified embodiment, the mounting surface of the light source module is inclined in such a manner that a light source arrangement portion 41A of a heat sink 40A gradually increases in thickness from the back to the front.

More specifically, the mounting surface (concave portion) of the first light source module 10 is included in such a manner that the thickness of a first light source arrangement portion 41Aa gradually increases from the back to the front. In other words, compared to the first light source arrangement portion 41a according to the above embodiment, the mounting surface of the first light source module 10 on the first light source arrangement portion 41Aa inclines so as to near the reflector 30.

Similarly, the mounting surface (concave portion) of the second light source module 20 is included in such a manner that the thickness of a second light source arrangement portion 41Ab gradually increases from the back to the front. In other words, compared to the second light source arrangement portion 41b according to the above embodiment, the mounting surface of the second light source module 20 on the second light source arrangement portion 41Ab inclines so as to near the reflector 30.

With this, compared to the above embodiment, the first light source module 10 and the second light source module 20 are arranged inclined at an angle in such a manner that the front end of the substrate nears the reflector 30.

Figure 17A:
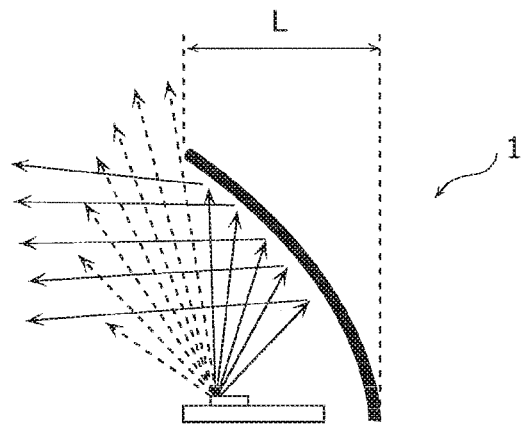
FIG. 17A is for illustrating the ray paths of light emitted from the first light source module in the light source unit according to an embodiment of the present invention.

Next, an example of the functionality of the light source unit 1A according to the first modified embodiment will be described using FIG. 17A through FIG. 17C. FIG. 17A is for illustrating the ray paths of light emitted from the first light source module in the light source unit according to an embodiment of the present invention, and FIG. 17B and FIG. 17C are for illustrating the ray paths of light emitted from the first light source module in the light source unit according to the first modified embodiment of the present invention.

Figure 17B:
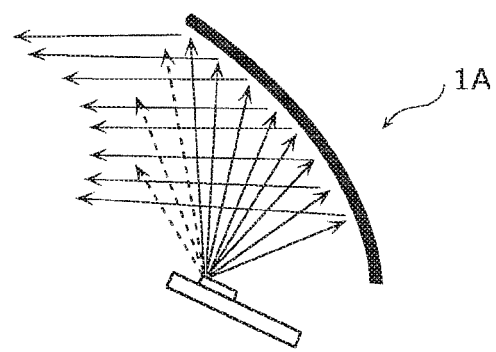
FIG. 17B is for illustrating the ray paths of light emitted from the first light source module in the light source unit according to the first modified embodiment of the present invention.
Figure 17C:
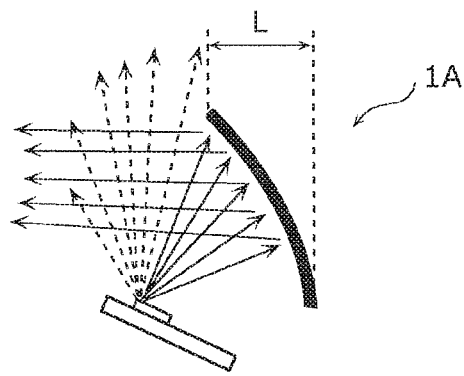
FIG. 17C is for illustrating the ray paths of light emitted from the first light source module in the light source unit according to the first modified embodiment of the present invention.

It should be noted that in FIG. 17A through FIG. 17C, the arrows drawn with solid lines indicate effective beams among the light emitted from the first light source module 10, and the arrows drawn with dashed lines represent null beams among the light emitted from the first light source module 10.

As is illustrated in FIG. 17A and FIG. 17B, when reflectors having the same shape are used, in the case of the light source unit 1A according to the first modified embodiment, it is possible to reduce the null beams and increase the effective beams compared to the light source unit 1 according to the above embodiment.

As a result, compared to the light source unit 1 according to the above embodiment, with the light source unit 1A according to the first modified embodiment, it is possible to increase brightness (improve performance) or obtain the same degree of brightness while reducing power consumption.

On the other hand, as is illustrated in FIG. 17A and FIG. 17C, if the effective beams are to be equal, the length L of the reflector in the depthwise direction can be reduced to make a more compact reflector, thus contributing to a more compact light source unit.

Moreover, as with the first modified embodiment, by arranging the first light source module 10 and the second light source module 20 on an incline, the light source component (the first light source module 10 and the second light source module 20) becomes more difficult to view directly, thereby reducing glare and a blinding effect.
(Light Source Unit According to Second Modified Embodiment)

Figure 18A:
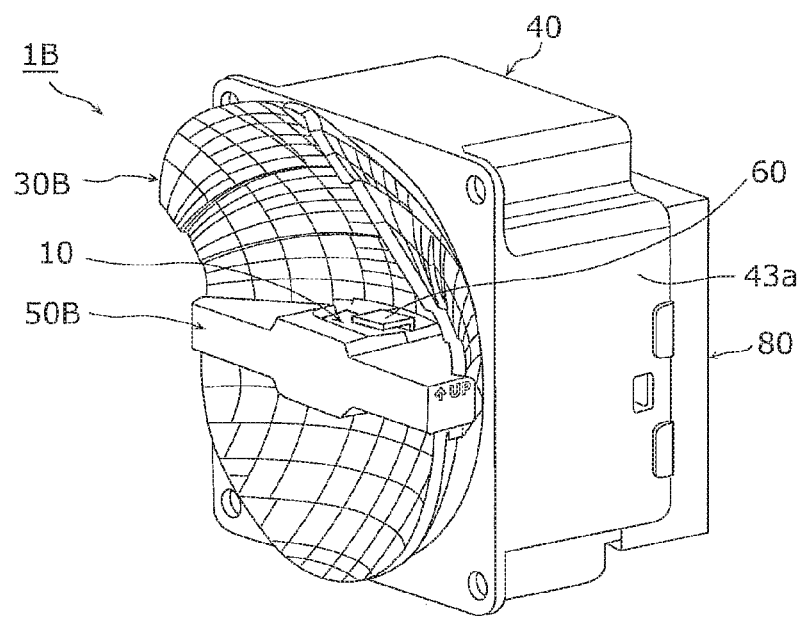
FIG. 18A is a perspective view of the front of the light source unit according to the second modified embodiment of the present invention from above.
Figure 18B:
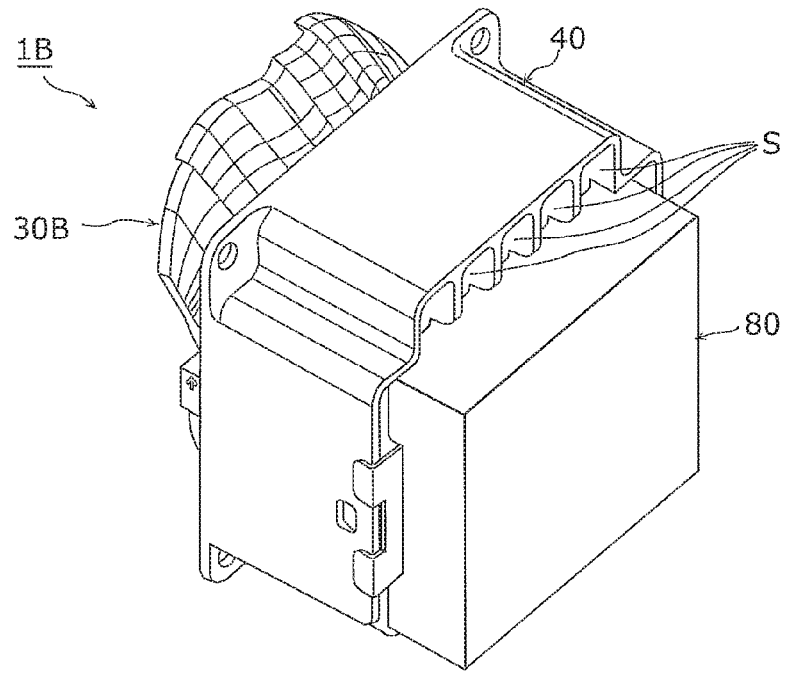
FIG. 18B is a perspective view of the back of the light source unit according to the second modified embodiment of the present invention from above.

Next, a light source unit 1B according to the second modified embodiment of the present invention will be described using FIG. 18A, FIG. 18B, and FIG. 19. FIG. 18A is a perspective view of the front of the light source unit according to the second modified embodiment of the present invention from above. FIG. 18B is a perspective view of the back of the light source unit according to the second modified embodiment of the present invention from above. (a) in FIG. 19 is a front view of the light source unit according to the second modified embodiment of the present invention, (b) in FIG. 19 is a top view of the same light source unit, (c) in FIG. 19 is a bottom view of the same light source unit, (d) in FIG. 19 is a left side view of the same light source unit, and (e) in FIG. 19 is a right side view of the same light source unit.

The light source unit 1B according to the second modified embodiment differs from the light source unit 1 according to the above embodiment in regard to the configuration of a reflector 30B and a light-blocking component 50B. It should be noted that all other configurations are similar to the light source unit 1 according to the above embodiment, and as such, descriptions thereof are omitted.

As is illustrated in FIG. 18A, FIG. 18B, and FIG. 19, with the light source unit 1B according to the second modified embodiment, the upper portion of the reflector 30B extends further forward than the light-blocking component 50B.

Figure 20A:
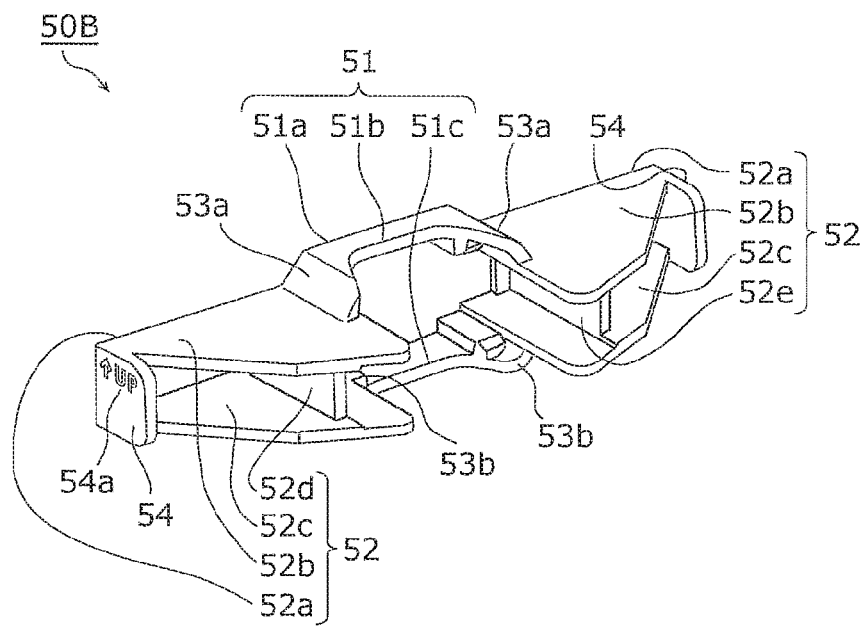
FIG. 20A is a perspective view of the light-blocking component in the light source unit according to the second modified embodiment of the present invention.
Figure 20B:
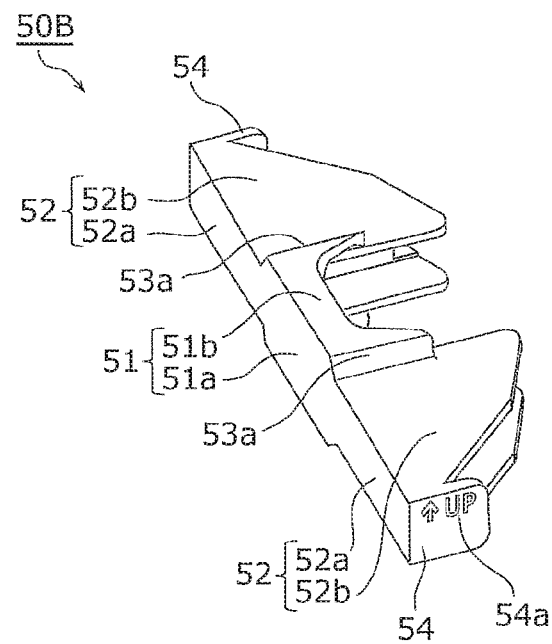
FIG. 20B is a perspective view of the light-blocking component in the light source unit according to the second modified embodiment of the present invention.

The light-blocking component 50B is configured to surround the light-emitting units of the first light source module 10 and the second light source module 20, as is illustrated in FIG. 20A and FIG. 20B. More specifically, compared to the light-blocking component 50 according to the above embodiment, the light-blocking component 50B includes light-blocking walls 53a which connect the side wall portions of the upper extension portion 51b of the central portion 51 and the two upper extension portions 52b of the side portions 52. Moreover, the light-blocking component 50B includes light-blocking walls 53b in positions connecting the side wall portions of lower extension portion 51c of the central portion 51 and the lower extension portions 52c of the side portions 52.

The light-blocking walls 53a are configured to cover the sides of the light-emitting unit of the first light source module 10. The light-blocking walls 53b are configured to cover the sides of the light-emitting unit of the second light source module 20. The light-blocking walls 53a and 53b are provided on the frontward portion of the side portions 52 (for example, half of the side portions 52), but are not provided on the rearward side (reflector side).

Moreover, the light-blocking component 50B according to the second modified embodiment includes lettering 54a indicating directionality on a side wall 54 of the side portion 52. With this, when attaching the light-blocking component 50B to the light source arrangement portion 41, the light-blocking component 50B can be attached without mixing up which side is the top and which side is the bottom.

As is described above, in the second modified embodiment, the upper portion (top end portion) of the reflector 30B extends further forward than the light-blocking component 50B. This configuration makes it possible to reduce glare resulting from light leaking in the upward direction.

Furthermore, the light-blocking component 50B according to the second modified embodiment includes light-blocking walls 53a and 53b in addition to the upper extension portion 51b and the lower extension portion 51c. With this, the light-emitting units of the first light source module 10 and the second light source module 20 are covered on the sides by the light-blocking walls 53a and 53b in addition to on the top and bottom by the upper extension portion 51*b* and the lower extension portion 51*c*. This configuration makes it possible to reduce glare resulting from light leaking in the upward direction and from the sides.

Here, as is illustrated in FIG. 21, upon changing the orientation of the light source unit 1B according to the second modified embodiment and testing the light blocking effect (glare reducing effect) thereof, it was found that glare can be reduced since the first light source module 10 is practically non-visible from any angle. It should be noted that in (a) through (e) in FIG. 21, the orientation (angle) of the light source unit 1B varies in 30 degree intervals. As the 90 degree angle view from above ((c) in FIG. 21) illustrates, the first light source module 10 in the stand-alone body of the light source unit 1B can be seen slightly, but when the light source unit 1B is mounted in the vehicle front lamp, the first light source module 10 is practically non-visible and the effect of glare is virtually nonexistent.

(Vehicle Front Lamp)

Figure 22:
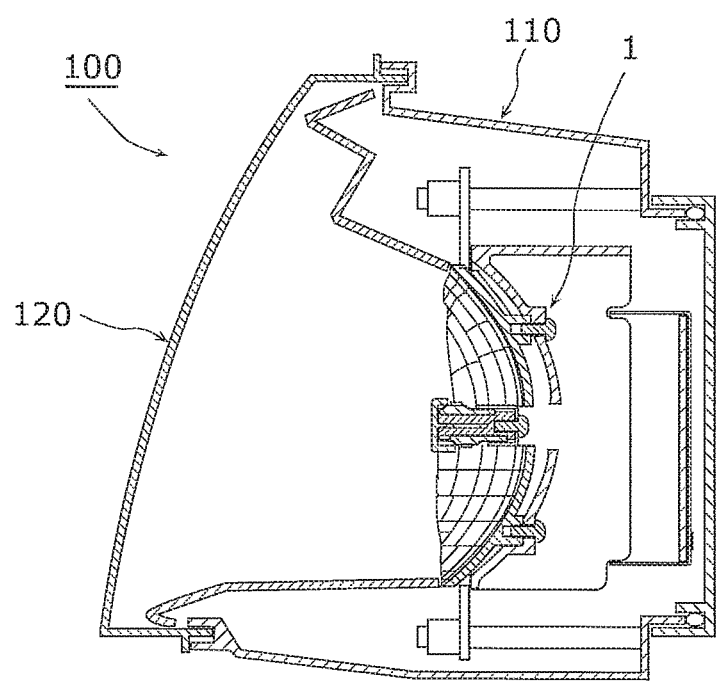
FIG. 22 is a simplified cross-sectional view of the vehicle front lamp according to an embodiment of the present invention.

Next, the vehicle front lamp 100 according to the embodiment of the present invention will be described using FIG. 22. FIG. 22 is a simplified cross-sectional view of the vehicle front lamp according to an embodiment of the present invention.

As is illustrated in FIG. 22, the vehicle front lamp 100 according to the embodiment is a headlamp used in vehicles, such as two-wheeled vehicles or four-wheeled vehicles. The vehicle front lamp 100 includes the light source unit 1, a housing 110 to which the light source unit 1 is attached, and an optical component 120 arranged in front of the light source unit 1.

The housing 110 houses and retains the light source unit 1. For example, the housing 110 and the light source unit 1 can be fixed together by screwing a screw inserted in the attachment hole 44 of the light source unit 1 into a screw hole provided in the housing 110. It should be noted that the housing 110 may be configured of a plurality of components.

The optical component 120 is, for example, a headlamp cover (front cover) that is transparent, and light emitted from the light source unit 1 passes through the optical component 120 to the outside. Moreover, the optical component 120 may have a light diffusing function or a lens function.

The inside of the vehicle front lamp 100 configured in this way is hermetically sealed, for example, to keep water or dust from entering. It should be noted that a separate reflector, for example, may also be included inside the vehicle front lamp 100 between the light source unit 1 and the optical component 120.

In this way, the light source unit 1 can be used as the light source in the vehicle front lamp 100. It should be noted that the light source units 1A and 1B according to the first and second modified embodiments may be used as a substitute for the light source unit 1.

Other Modified Embodiments

The light source unit and the vehicle front lamp have herein been described based on embodiments of the present invention, but the present invention is not limited to the above embodiments.

For example, in the above embodiment and modifications thereof, the positioning of the reflector 30 and the heat sink 40 is determined by the protruding portion (bulge) 34 provided on the reflector 30 and the sunken portion (depression) 42*a* provided in the heat sink 40, but conversely the sunken portion (depression) may be provided in the reflector 30 and the protruding portion (bulge) may be provided on the heat sink 40 for determining the positioning. It should be noted that in order to determine the relative positional relationship of the reflector 30 and the heat sink 40, a protruding portion may be provided on one of the reflector 30 and the concave portion 42. In this case, the protruding portion provided on one of the reflector 30 and the concave portion 42 may be configured to extend toward and abut the other of the reflector 30 and the concave portion 42.

Moreover, in the above embodiment and modifications thereof, two light source modules—the first light source module 10 and the second light source module 20—are used as the light source components, but simply one or the other may also be used.

Moreover, in the above embodiment and modifications thereof, a COB structure LED module is used for the first light source module 10 and the second light source module 20, but a surface mount device (SMD) structure LED module may be used. For example, as the SMD type LED module, a package type LED elements (SMD type LED element), in which an LED chip (light-emitting element) is mounted in a cavity in a resin container and the cavity is sealed with a sealing component (phosphor-containing resin), may mounted on the substrate 11 in plurality.

Moreover, in the above embodiment and modifications thereof, a configuration in which white light is radiated using a yellow phosphor on a blue LED chip is used, but the present invention is not limited to this example. For example, in order to increase color rendering properties, in addition to the yellow phosphor, a red phosphor or a green phosphor may be mixed in. Moreover, a configuration is possible in which, without using a yellow phosphor, a phosphor-containing resin which includes red and green phosphors is used and white light is radiated when used in combination with a blue LED chip.

Moreover, in the above embodiment and modifications thereof, a blue LED chip is used, but an LED chip which emits light of a color other than blue may be used. For example, when an LED chip which emits ultra-violet rays is used, a combination of phosphor particles which respectively emit the three primary colors (red, green and blue) can be used. Furthermore, wavelength converting materials other than phosphor particles may be used. For example, materials including a substance which absorbs a certain wavelength of light and emits light of a different wavelength, such as semiconductors, metal complexes, organic dyes, and pigments, may be used.

Moreover, in the above embodiment and modifications thereof, the light-emitting element is exemplified by an LED, but a semiconductor light-emitting element such as a semiconductor laser, an electro luminescence (EL) element such as an organic EL element or an inorganic EL element, or other solid-state light-emitting elements may be used.

Moreover, in the above embodiment and modifications thereof, the light source unit is exemplified as being used in the vehicle front lamp used in vehicles such as two-wheeled vehicles or four-wheeled vehicles, but the present invention is not limited to this example. For example, the light source unit may be applied to lighting equipment other than a vehicle front lamp, such as lighting equipment used outdoors like a road sign or billboard, or lighting equipment used indoors.

Although only some exemplary embodiments of the present invention have been described in detail above, those skilled in the art will readily appreciate that many modifications are possible in the exemplary embodiments without materially departing from the novel teachings and advantages of the present invention. Accordingly, all such modifications are intended to be included within the scope of the present invention.

The invention claimed is:

1. A light source unit, comprising:
   a first light source module;
   a second light source module; and
   a light source arrangement portion between the first light source module and the second light source module, wherein
   the first light source module and the second light source module are staggered in at least one of a front-and-back direction and a left-and-right direction,
   the first light source module and the second light source module are arranged sandwiching the light source arrangement portion from above and below, and
   the first light source module and the second light source module are disposed in different positions in the left-and-right direction, wherein the left-and-right direction is a direction perpendicular to both an up-and-down direction and the front-and-back direction.

2. The light source unit according to claim 1,
   wherein the first light source module is positioned further forward than the second light source module.

3. The light source unit according to claim 1,
   wherein the first light source module is a low-beam light-emitting diode (LED) module, and the second light source module is a high-beam LED module.

4. The light source unit according to claim 1, further comprising
   a reflector that reflects light from the first light source module and the second light source module; and
   a light-blocking component that blocks a portion of the light emitted from at least one of the first light source module and the second light source module and reflected off the reflector, the light-blocking component blocking the portion of the light to form two predetermined types of beam patterns,
   wherein the light-blocking component has a surface that reduces light reflection.

5. The light source unit according to claim 4,
   wherein the surface of the light-blocking component is deglossed.

6. The light source unit according to claim 4,
   wherein a reflection rate of visible light on the surface of the light-blocking component is at least less than a reflection rate of visible light on the reflector.

7. The light source unit according to claim 4,
   wherein a surface roughness Ra of the light-blocking component is at least 0.5 µm.

8. The light source unit according to claim 4, further comprising
   a heat sink,
   wherein the light source arrangement portion is formed as a portion of the heat sink extending therefrom, and
   the light-blocking component is attached to the light source arrangement portion and positioned in front of the first light source module and the second light source module.

9. The light source unit according to claim 4,
   wherein the light-blocking component forms a cut-off line.

* * * * *